United States Patent
Bhandarkar et al.

(10) Patent No.: US 12,519,347 B2
(45) Date of Patent: Jan. 6, 2026

(54) FOREIGN OBJECT DETECTION BY FREQUENCY BANDWIDTH COMPARISON

(71) Applicant: Microchip Technology Incorporated, Chandler, AZ (US)

(72) Inventors: Santosh Bhandarkar, Chandler, AZ (US); Alex Dumais, Boise, ID (US)

(73) Assignee: Microchip Technology Incorporated, Chandler, AZ (US)

( * ) Notice: Subject to any disclaimer, the term of this patent is extended or adjusted under 35 U.S.C. 154(b) by 35 days.

(21) Appl. No.: 18/432,657

(22) Filed: Feb. 5, 2024

(65) Prior Publication Data

US 2025/0079908 A1    Mar. 6, 2025

Related U.S. Application Data

(60) Provisional application No. 63/536,883, filed on Sep. 6, 2023.

(51) Int. Cl.
*H02J 50/60* (2016.01)
*H02J 50/12* (2016.01)
*H02J 50/40* (2016.01)

(52) U.S. Cl.
CPC .............. *H02J 50/60* (2016.02); *H02J 50/12* (2016.02); *H02J 50/402* (2020.01)

(58) Field of Classification Search
CPC ......... B60L 53/124; H02J 50/60; H02J 50/12; H02J 50/40
See application file for complete search history.

(56) References Cited

U.S. PATENT DOCUMENTS

| 11,264,842 | B2 | 3/2022 | Bhandarkar et al. | |
| 2017/0366048 | A1 | 12/2017 | Watanabe et al. | |
| 2020/0259373 | A1* | 8/2020 | Park | H02J 50/80 |
| 2020/0271813 | A1* | 8/2020 | Cheikh | G01V 3/12 |
| 2023/0075161 | A1* | 3/2023 | Shimura | H02J 50/60 |

FOREIGN PATENT DOCUMENTS

| CN | 111245107 A | 6/2020 | H02J 50/12 |
| KR | 20200032943 A | 3/2020 | G01V 3/06 |

OTHER PUBLICATIONS

International Search Report and Written Opinion, Application No. PCT/US2024/014719, 13 pages, Jun. 4, 2024.

* cited by examiner

*Primary Examiner* — Rexford N Barnie
*Assistant Examiner* — Terrence R Willoughby
(74) *Attorney, Agent, or Firm* — SLAYDEN GRUBERT BEARD PLLC

(57) ABSTRACT

A wireless power transmitter and methods to: determine a transmitter frequency bandwidth of the wireless power transmitter when no wireless power receiver is inductively coupled with the wireless power transmitter; determine a transmitter-receiver frequency bandwidth when a wireless power receiver is inductively coupled with the wireless power transmitter; compare the transmitter-receiver frequency bandwidth and the transmitter frequency bandwidth; and detect a foreign object near the transmit coil based on the comparison of the transmitter-receiver frequency bandwidth and the transmitter frequency bandwidth.

21 Claims, 19 Drawing Sheets

FIGURE 10B  Replacement Drawing

FOREIGN OBJECT DETECTION BY FREQUENCY BANDWIDTH COMPARISON

PRIORITY STATEMENT

This application claims priority to U.S. Provisional Patent Application No. 63/536,883, filed 6 Sep. 2023, the contents of which are hereby incorporated in their entirety.

TECHNICAL FIELD

The present disclosure relates generally to wireless power transfer, and more specifically to object detection in multi-coil wireless power transmitters.

BACKGROUND

Wireless power transfer systems may transfer power from one electronic device to another electronic device. More specifically, a transmitter of a transmitting device may generate an electromagnetic field, and a receiver of a receiving device may extract power from the electromagnetic field. Qi is a widely adopted wireless charging standard and it has proliferated broadly across consumer cell phone brands.

A Qi wireless system comprises a transmitter and a receiver. The transmitter controls the power transferred to the receiver based on the feedback received from the receiver. The transmitter contains at least one coil with which the receiver coil is coupled in a typical wireless system. In a multi-coil transmitter design, there are multiple transmit coils overlapping each other so that the receiver coil can be placed on any of the coils. This provides spatial freedom for receiver placement and an approximate placement on the transmitter ensures power transfer. This contrasts with the single coil transmitter where the receiver coil is to be properly aligned with the single transmit coil for power transfer.

One of the functions of the transmitter is to detect the presence of a receiver on one of its coils. The Qi specification recommends using two methods for receiver detection namely analog ping and digital ping. One of the issues with these detection methods is to differentiate between the receiver and the receiver in combination with a foreign object. Both analog ping and digital ping methods fail to accurately identify the presence of foreign object, particularly when the transmitters have magnets on them. The foreign object, if left undetected, can cause the transmitter to believe that it is a part of the receiver. This could lead to issues such as incorrect power loss calibration, and the foreign object will continue to get power thereby leading to its heating and wastage of power. One of the methods recommended in the Qi specification provides for the receiver to send a reference Q value taken with a Medium Power A1 (MP-A1) transmit coil with a 2 mm spacer. The value of Q is taken at 100 kHz and is sent by the receiver to the transmitter during the calibration phase. The transmitter uses the reference value to detect if a foreign object is present.

The reference Q value was first used for MPA1 type transmitter design and has been used since. One of the methods used to measure the Q is to use several receivers with a different Q and try to fit a curve across the Q range with the new transmitter and the reference Q it would send. However with this method the measurements become a function of the receivers used and may not be accurate because Q is a ratio depending on the values of inductance L and resistance R, and different receivers with same Q and different L, R values will provide different reference Q values when placed on the transmitter. Further with low Q transmitters or transmitters with magnets, the Q value is very low, which may make it difficult to detect the foreign object.

The method proposed in Qi specification may work well with the initially proposed transmitters which had transmitter characteristics like the MPA1 transmitter. However, with newer transmitter topologies, the characteristics have changed, due to which the original Q method is not accurate enough to detect the foreign objects. Some of the transmitters have low Q while others have magnets embedded with the coil, due to which the sensitivity of the Q method is significantly reduced.

There is a need for a way to accurately detect the presence of foreign objects with multi-coil wireless power transmitters without using a reference Q value sent by the receiver.

SUMMARY

Aspects provide for accurately detecting the presence of foreign objects by wireless power transmitters with at least one transmit coil.

Aspects provide a device comprising: a controller of a wireless power transmitter to: determine a transmitter frequency bandwidth of the wireless power transmitter when no wireless power receiver is inductively coupled with the wireless power transmitter; determine a transmitter-receiver resonant frequency bandwidth when a wireless power receiver is inductively coupled with the wireless power transmitter; compare the transmitter-receiver resonant frequency bandwidth and the transmitter resonant frequency bandwidth; and detect a foreign object near the transmit coil based on the comparison of the transmitter-receiver resonant frequency bandwidth and the transmitter resonant frequency bandwidth.

According to an aspect there is provided a method comprising: controlling of a wireless power transmitter by: determining a transmitter frequency bandwidth of the wireless power transmitter when no wireless power receiver is inductively coupled with the wireless power transmitter; determining a transmitter-receiver resonant frequency bandwidth when a wireless power receiver is inductively coupled with the wireless power transmitter; comparing the transmitter-receiver resonant frequency bandwidth and the transmitter resonant frequency bandwidth; and detecting a foreign object near the transmit coil based on the comparison of the transmitter-receiver resonant frequency bandwidth and the transmitter resonant frequency bandwidth.

An aspect provides a system comprising: a wireless power transmitter comprising: a tank circuit including a transmit coil to inductively couple to a receive coil of a wireless power receiver; and a controller of the wireless power transmitter to: determine a transmitter frequency bandwidth of the wireless power transmitter when no wireless power receiver is inductively coupled with the wireless power transmitter; determine a transmitter-receiver frequency bandwidth when a wireless power receiver is inductively coupled with the wireless power transmitter; compare the transmitter-receiver resonant frequency bandwidth and the transmitter frequency bandwidth; and detect a foreign object near the transmit coil based on the comparison of the transmitter-receiver frequency bandwidth and the transmitter resonant frequency bandwidth.

BRIEF DESCRIPTION OF THE DRAWINGS

The figures illustrate examples of devices and methods for detecting the presence of foreign objects by wireless power transmitters with one or more transmit coils.

FIG. 10B illustrates a zoomed-in version of the plot shown in FIG. 10A near a transition between an AC signal on a period of time and a data collection period of time.

Figure 1:
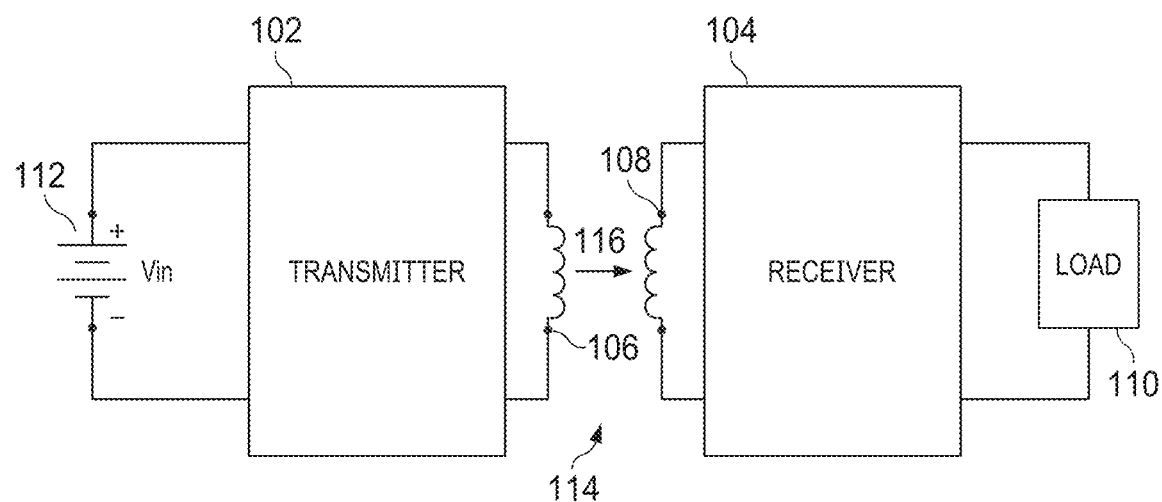
FIG. 1 is a block diagram of a wireless power system.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

According to an aspect, there is provided a method to use a frequency bandwidth of the system to detect the presence or absence of a foreign object in the system. The frequency bandwidth of the system may be defined as frequency range where the magnitude of the gain is 3 dB from the peak magnitude. The transmitter frequency bandwidth may be defined as the frequency range where a magnitude of the gain is about 3 dB from a peak magnitude. The transmitter-receiver frequency bandwidth may therefore be defined as the frequency range where a magnitude of the gain is about 3 dB from a peak magnitude when the transmitter is magnetically coupled with the receiver. The term frequency bandwidth, as used herein, refers to the frequency range where the magnitude of the gain is a predetermined magnitude less than the peak magnitude. As an example, and as is commonly used, the frequency bandwidth is determined where the magnitude of the gain is 3 dB below the peak magnitude. The quality factor, Q, for a circuit is defined as the electric energy stored in the circuit divided by the energy dissipated in one period. The bandwidth of the transmitter is inversely proportional to Q and has different characteristics in the presence of foreign objects. When a receiver is placed in proximity to the transmitter, the bandwidth of the system reduces significantly compared to the bandwidth of the transmitter alone. However, when a foreign object is placed along with the receiver, the bandwidth of the system is much higher than the bandwidth of the transmitter alone. Due to these differences in the bandwidth of the system, the presence of a metal foreign object along with the receiver can be accurately detected.

A response current versus frequency curve of a resonant circuit may provide a maximum current at a resonant frequency. The frequency bandwidth of the resonant circuit may be defined as the total number of cycles below and above the resonant frequency for which the current is equal to or greater than 70.7% of its resonant value (20*log 10(0.707)=3 dB). The two frequencies in the curve that are at 0.707 of the maximum current are the half-power frequencies, i.e., where the magnitude of the gain is 3 dB from the peak magnitude. Half-power frequencies of a resonant circuit may also be referred to as the band frequencies, the critical frequencies, or the cutoff frequencies.

Aspects accommodate variations caused due to placement and different types of receivers. The bandwidth of the system is defined as the ratio of the resonant frequency to Q. Bandwidth measurement does not require additional circuits compared to many existing Qi circuits. The transmitter may be driven by pulse width modulation (PWM) for a certain number of cycles and then turned OFF, at which point the LC resonant tank circuit of the transmitter resonates at the resonance frequency depending on the inductance L and capacitance C values of the transmitter and receiver, where the receiver is magnetically coupled to the transmitter due to its proximity. The rate of decay is dependent on the resistance in the circuit. However, different receivers have different inductance and resistance depending on its coil. The presence of the receiver changes the resonant frequency of the transmitter, as measured by itself, as well as the decay rate. A higher resistance in the circuit lowers the Q, while a higher inductance increases the Q. The receiver inductance reflects as a positive inductance value which gets added to the transmitter inductance. The resistance of the receiver also gets added to the transmitter resistance when seen from the transmitter side. The resonant frequency decreases when additional inductance is present in the system. However, when a foreign object is present, the resonant frequency increases, while the Q decreases, due to which the bandwidth of the system increases compared to the standalone bandwidth. As Q increases, the resonant frequency decreases and the bandwidth increases (B=F/Q). In particular, the frequency bandwidth increases when a foreign object is present.

The method can be used with various transmitter designs where a variety of inductance and resistance values could be used. This could be due to the changes in the coil or the MOSFETs used in the inverter circuits.

FIG. 1 shows a block diagram of a prior art wireless power system. It comprises a transmitter 102 and a receiver 104. The transmitter 102 may be powered by a direct current (DC) voltage source 112, while the receiver 104 is connected to a load 110. Power 116 is transferred from the transmitter 102 to the receiver 104 through a set of coupled coils 114. The power transmission is efficient when the coupled coils 114 are placed one over the other and have the closest alignment.

The transmitter 102 may detect the presence of a foreign object in proximity thereto. Wireless power system 100 further includes a plurality of transmit coils 106 (of which one is shown in FIG. 1) associated with transmitter 102 and a receive coil 108, which may be used to transfer power 116 from transmitter 102 to receiver 104 (e.g., via inductive coupling). When a transmit coil 106 is in proximity with receive coil 108 the transmit coils 106 and the receive coil 108 may be coupled coils 14 (e.g., at least one of the transmit coils 106 may be inductively coupled to the receive coil 108). No physical connection may be implemented between the transmitter 102 and the receiver 104 to transfer power 116 from the transmitter 102 to the receiver 104. Rather, the power 116 is transferred using magnetic flux linkage. The transmitter 102 may control the power 116 transferred by controlling a voltage potential amplitude, frequency, phase, and/or duty cycle provided to the transmit coil 106.

Power transmission may be efficient when one of the transmit coils 106 is properly aligned with receive coil 108. The transmitter 102 uses one of the transmit coils 106 that has a strongest coupling with the receive coil 108 to transmit the power 116 to the receiver 104. The transmitter 102 may detect the presence of the receive coil 108 by itself, or the receive coil 108 and some other conductive foreign object together. Also, if the receive coil 108 is detected, the transmitter 102 may select one of the transmit coils 106 (e.g., the transmit coil with the strongest coupling to the receive coil 108) to transmit the power 116 to the receive coil 108, as is discussed in more detail below.

Figure 2:
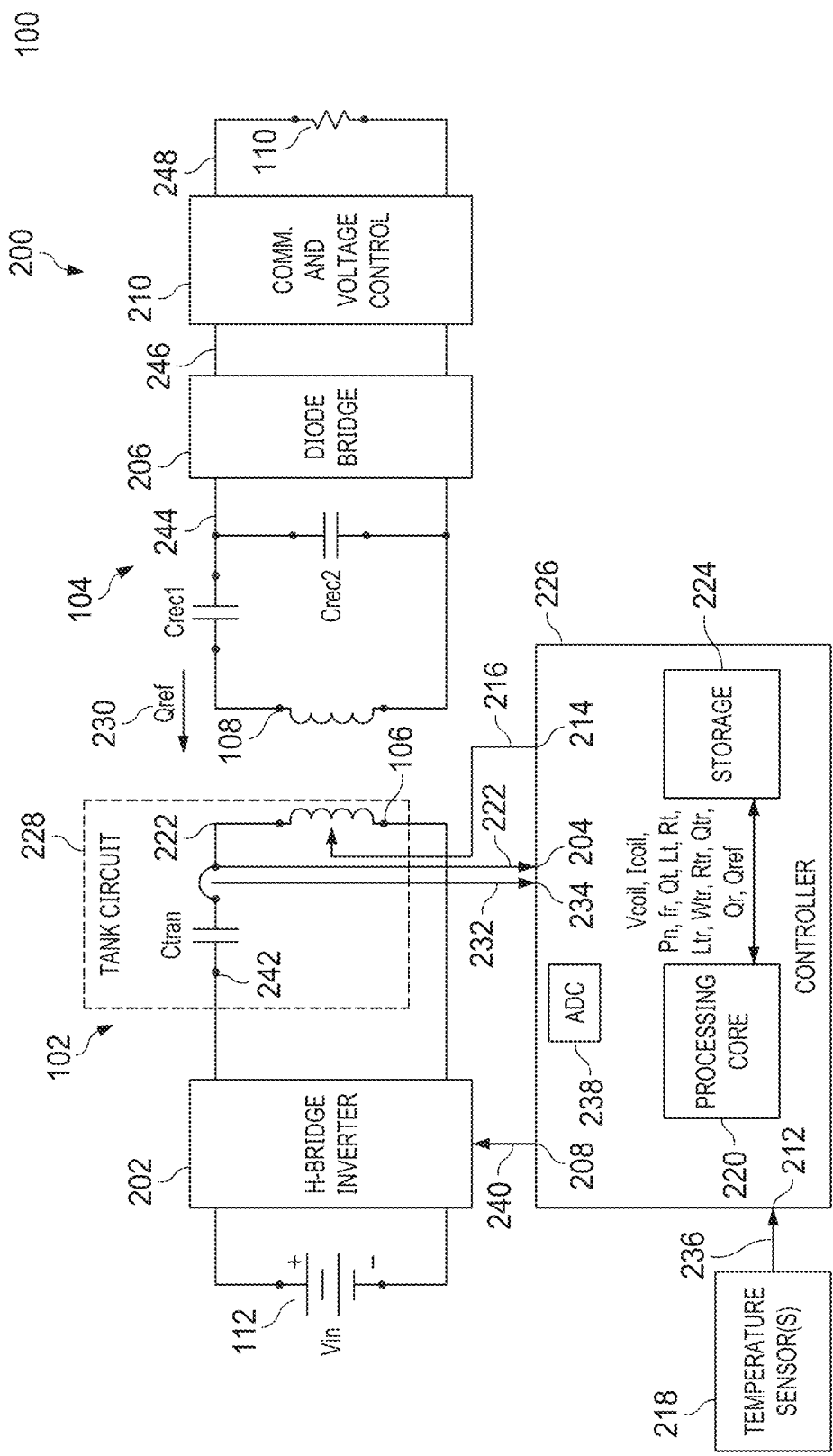
FIG. 2 is a block diagram of a wireless power system configured to detect the presence of a foreign object.

FIG. 2 is a more detailed block diagram of the prior art wireless power system 100 of FIG. 1, wherein FIG. 2 illustrates the transmitter 102, the receiver 104, one of the transmit coils 106, the receive coil 108, the voltage source 112, and the load 110 illustrated in FIG. 1. FIG. 2 shows the receiver 104 has a resonant tank circuit 230 formed by the receive coil 108 and the receive capacitors Crec1 and Crec2. The output of the resonant tank circuit 230 is passed through a diode bridge rectifier 206 which rectifies the voltage. The output of the diode bridge rectifier 206 may be passed through either a buck converter or a low dropout regulator (LDO), not shown, which provides a fixed voltage at the output load 110.

At the transmitter 102, voltage across the transmit coil 106 may be connected to an analog to digital converter (ADC) 238 of the controller 226 using operational amplifiers with a bias of Vcc/2, where Vcc represents the voltage provided by H-bridge inverter 202. The controller 226 may be implemented by a dsPIC central processing unit or digital signal controller, by Microchip Technology Incorporated of Chandler, Arizona, without limitation. The controller 226 may provide pulse width modulator (PWM) pulses as control signals 240 to H-bridge inverter 202 with either a fixed or variable frequency depending on the topology of the transmitter 102. The controller 226 may sample the coil voltage potential 222 across transmit coil 106 in sync with the PWM signals of the AC control signals 240 for Q computation. The coil voltage potential 222 may also be used by the controller 226 to measure the resonant frequency. The ratio of resonant frequency and Q may provide the frequency bandwidth of the system 100 in Hz.

As illustrated in FIG. 2, the transmitter 102 includes H-bridge inverter 202, a transmit tank circuit 228 (including the transmit coil 106 and a transmit capacitor Ctran electrically connected in series between the transmit coil 106 and the H-bridge inverter 202), one or more temperature sensor(s) 218, and controller 226. The H-bridge inverter 202 is electrically connected between the voltage source 112 and the transmit tank circuit 228. As indicated above, the receiver 104 includes a resonant tank circuit 230 formed by the receive coil 108 and the receive capacitors Crec1 and Crec2. Accordingly, the receiver 104 may include receive capacitors Crec1 and Crec2, diode bridge rectifier 206, and communication and voltage control circuitry 210. The receiver capacitor Crec1 may be electrically connected in series between the receive coil 108 and the diode bridge rectifier 206. The receiver capacitor Crec2 may be electrically coupled in parallel across the diode bridge rectifier 206. The diode bridge rectifier 206 may be configured to rectify an AC received signal 244 received from the transmitter 102 to provide a DC power signal 246. Accordingly, the output of the resonant tank circuit 230 is passed through the diode bridge rectifier 206, which rectifies the AC received signal 244. The communication and voltage control circuitry 210 may receive the DC power signal 246 and produce a load voltage potential 248 to the load 110. By way of non-limiting example, the communication and voltage control circuitry 210 may include a buck converter or a low-dropout regulator (LDO), which provides a fixed load voltage potential 248 at the output load 110. The communication and voltage control circuitry 210 may be implemented in a controller (e.g., microcontroller), without limitation.

The controller 226 of the transmitter 102 may include a processor or processing core 220 electrically connected to one or more data storage devices (storage 224). Various functions of the controller 226 may be performed by the processing core 220. The controller 226 also includes a coil voltage potential input 204 to receive coil voltage potential 222 and a coil current input 234 to receive a coil current representation 232 indicating an electrical current of the transmit coils 106. The controller 226 further includes analog to digital converter (ADC 238) to sample the coil current representation 232 at the coil current input 234, the coil voltage potential 222 at the coil voltage potential input 204, or both, and provide the sampled coil current representation 232 to the processing core 220. Coil voltage potential 222 may be a scaled representation of the actual coil voltage potential, and/or the coil current representation 232 may be a scaled representation of the actual coil current.

The controller 226 further includes a coil select output 214 to provide one or more coil select signals 216 to the transmit coils 106. The coil select signals 216 are to selectively control which of the transmit coils 106 conducts an alternating current (AC) signal (AC signal 242) provided to the transmit tank circuit 228 by the H-bridge inverter 202. The controller 226 also includes an AC control output 208 to provide one or more AC control signals 240 to the H-bridge inverter 202. The AC control signals 240 control the AC signal 242 applied to the transmit tank circuit 228 by the H-bridge inverter 202. For example, with the H-bridge inverter 202 electrically connected between the voltage source 112 and the transmit tank circuit 228, the controller 226 may selectively apply the AC control signals 240 to convert the input voltage potential Vin (e.g., a DC voltage potential) provided by the voltage source 12 to a square wave AC signal 242 (e.g., by periodically inverting the input voltage Vin). The square wave is of potential Vcc at about IV.

The controller 226 calculates an expected Q-factor value (Qt and Qtr) using measurements taken at the transmitter 102 (e.g., the coil current representation 232 and or the coil voltage potential input 204) when the receiver is inductively coupled with the transmitter. The controller 226 samples the coil voltage potential 222 and the coil current representation 232 of the transmit coils 106. The controller 226 also drives the AC control signals 240 with either a fixed or a variable frequency depending on the topology of the transmitter 102. The controller 226 drives the H-bridge inverter 202 using the AC control signals 240 to deliver the AC signal 242 to the transmit tank circuit 228 for a certain number of cycles of the AC signal 242 and then turns off the AC control signals 240. The AC control signals 240 may be pulse width modulation signals generated by the controller 226. After the AC control signals 240 are turned off, the transmit tank circuit 228 may resonate at its resonant frequency depending on inductance and capacitance values of the transmit coils 106, the receive coil 108, the transmit capacitor Ctran, and the receive capacitors Crec1 and Crec2. The rate of decay of the coil voltage potential 222 depends on the resistance in the transmitter 102. In the transmitter 102, resistance may be in transmit coil 106, an inverter MOSFETs RDSon, a capacitor ESR, and PCB traces, without limitation. In the receiver 104, resistance may be in the receive coil 108, a capacitor ESR, and PCB traces, without limitation. The presence of the receiver 104 changes the resonant frequency of the transmit tank circuit 228 as well as the decay rate of the coil voltage potential 222, as compared with the resonant frequency and the decay rate in the absence of the receiver 104. A higher resistance in the transmitter 102 lowers the Q-factor value of the transmitter 102, while a higher inductance of the transmit coils 106 increases the Q-factor value of the transmitter 102. While the transmit coils 106 are inductively coupled to the receive coil 108, the inductance of the receive coil 108 manifests at the transmitter 102 as a positive inductance value that is added to the inductance of the transmit coils 106 (i.e., the effective inductance value of the transmit coils 106 increases while coupled to the receive coil 108). The resistance of the receiver 104 also is added to the resistance of the transmitter 102 from the perspective of the transmitter 102 (i.e., the effective resistance of the transmitter 102 increases while coupled to the receive coil 108 responsive to the resistance of the receiver 104). Even if the Q-factor value of the tank circuit 228, which may be proportional to the ratio between the inductance of the transmit coils 106 to the resistance of the transmitter 102, is monitored, it may, however, be difficult to judge whether a change in the Q-factor value of the tank circuit 228 is due to the coupling with the receiver 104 or coupling with a foreign object. The coupling factor between the transmitter and receiver may determine the Q value with inductance L and resistance R being fixed. With poor coupling, the Q may increase, similar to when a foreign object is present.

Figure 3:
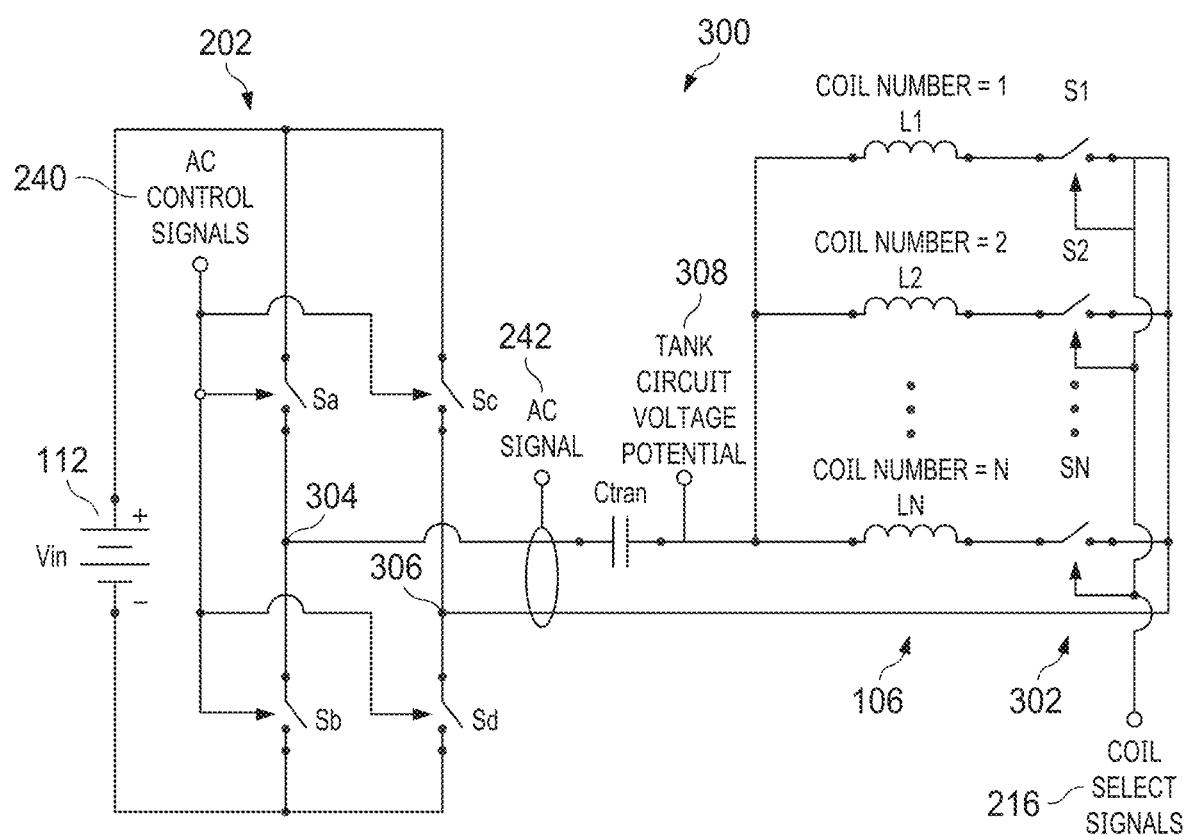
FIG. 3 is a schematic illustration of a segment of a wireless power transmitter of FIG. 1 and FIG. 2.

FIG. 3 is a schematic illustration of a segment 300 of the prior art wireless power transmitter 102 of FIG. 1 and FIG. 2. Referring to FIG. 2 and FIG. 3 together, the segment 300 includes the voltage source 112, the H-bridge inverter 202, illustrated as comprising four switches Sa. Sb, Sc and Sd, the transmit capacitor Ctran, and the transmit coils 106 (L1, L2, ..., LN) discussed above. An input of the H-bridge inverter 202 is illustrated in FIG. 3 as being electrically connected to the voltage source 112. There is a tank circuit voltage potential 308. See FIG. 3. Alternatively, the input of the H-bridge inverter 202 may instead be electrically connected to an output of a converter (not shown) (e.g., a DC to DC converter such as a four-switch buck boost converter (FSBBC), without limitation).

In this example, the transmitter 102 comprises a metal-oxide-semiconductor field-effect transistor (MOSFET) H-bridge inverter 202, which is controlled by the controller 226 (not shown). The transmit tank circuit 228 (see FIG. 2) is formed by capacitor Cm and the coil LN connected across the H-bridge inverter 202 output. The H-bridge inverter 202 comprises four switches Sa-Sd as shown in FIG. 2. Each switch may be a metal-oxide-semiconductor field-effect transistor (MOSFET) driven by a MOSFET driver. The MOSFET driver inputs are controlled by PWM signals from the controller 226, as AC control signals 240. In the positive half cycle, switches Sa and Sd are turned ON, while Sb and Sc are turned ON in the other half cycle. The frequency of operation is fixed at 120 kHz for the selected topology, but may vary. The H-bridge inverter 202 applies an AC voltage across the transmit tank circuit 228 formed by capacitance C and coil inductance L (i.e. the inductance of the respective coil, i.e. coils 1-3). Each coil inductance L contains a respective one of coil switches 302, i.e. coil switches S1, S2, ..., SN, each electrically connected serially with a respective transmit coil 106, which series switch SN, which when closed, responsive to coil select signals 216, places the respective coil in the transmit tank circuit 228. One coil is connected to the transmit tank circuit 228 at a time. The series switches S1-SN for the respective transmit coils 106 can be constructed of back-to-back MOSFETs for conducting bidirectional AC current in the transmit tank circuit 228.

The number N of the transmit coils 106 and the coil switches 302 may be any number (e.g., one, two, three, four, five, ten, twenty, without limitation). As indicated above, the coil switches 302 are electrically controllable to enable the controller 226 to selectively open and close the coil switches 302 via the coil select signals 216. By closing one of the coil switches 302 associated with one of the transmit coils 106, the associated one of the transmit coils 106 is effectively placed in the tank circuit 228 (FIG. 2). In some aspects, one of the transmit coils 106 is selected at a time (e.g., by closing the associated one of the coil switches 302). In some aspects the coil switches 302 may be transistors (e.g., back-to-back MOSFETs for conducting bidirectional AC current in the tank circuit) having gates electrically connected to the coil select signals 216. Accordingly, the coil select signals 216 provided by the controller 226 may include a bus of signals configured to individually control the coil switches 302.

The H-bridge inverter 202 also includes several electrically controllable switches (switches Sa, Sb, Sc, and Sd). Switches Sa, Sb, Sc, and Sd are electrically controllable via the AC control signals 240 from the controller 226 to generate the AC signal 242 across a first node 304 and a second node 306 of the H-bridge inverter 202. By way of non-limiting example, the switches Sa, Sb, Sc, and Sd may be transistors having the AC control signals 240 electrically connected to their gates. In some aspects switches Sa, Sb, Sc, and Sd may be MOSFET transistors driven by MOSFET drivers. The controller 226 may disable or turn off the AC signal 242 by de-asserting the AC control signals 240 at each of the switches Sa, Sb, Sc, and Sd (i.e., providing a voltage potential configured to open the switch). With the AC signal 242 disabled the first node 304 and the second node 306 may be in an electrically floating state. The controller 226 may drive the AC signal 242 by alternating between: closing switches Sa and Sd while opening switches Sc and Sb; and opening switches Sa and Sd while closing switches Sc and Sb. Switches Sa, Sb, Sc, and Sd may be closed by asserting the respective AC control signals 240. The AC control signals 240 provided by the controller 226 may include a bus of signals to control the switches Sa, Sb, Sc, and Sd. In some embodiments a single signal of the AC control signals 240 may control switches Sa and Sd and another signal may control switches Sc and Sd. In some aspects the AC control signals 240 may include four separate signals to control the switches Sa, Sb, Sc. and Sd separately. In some aspects MOSFET driver inputs (not shown) of MOSFET drivers (not shown) electrically coupled between the controller 226 (FIG. 2) and the switches Sa, Sb, Sc, and Sd are controlled by the AC control signals 240, which may be provided by pulse-width modulation (PWM) outputs from PWM output pins of the controller 226, without limitation. With switches Sa and Sd closed and switches Sb and Sc open the voltage potential across first node 304 and second node 306 may be Vin, resulting in a positive half cycle of the AC signal 242.

With switches Sa and Sd open and switches Sb and Sc closed the voltage potential across first node 304 and second node 306 may be −Vin, resulting in a negative half cycle of the AC signal 242. Accordingly, with alternation between these two states a square wave AC signal 242 across first node 304 and second node 306 results. By way of non-limiting example, a frequency of operation (i.e., a switching frequency, which in turn amounts to a frequency of the AC signal 242) may be set to substantially 125 k Hz. As a result, the H-bridge inverter 202 applies the AC signal 242 across the tank circuit 228 (FIG. 2) formed by a capacitance of the transmit capacitor and an inductance of the transmit coils 106.

The controller 226 periodically controls the wireless power transmitter 102 to perform an object detection operation. In time periods between object detection operations the wireless power transmitter 102 may operate in a low power state (e.g., a sleep mode or a standby mode) to conserve power. The object detection operation includes a data collection method and a data processing method.

In the data collection method the controller 226 sets a coil number equal to a first number. Each transmit coil of the transmit coils 106 is associated with a particular number from the first number to a last number, as illustrated in FIG. 3. For example, transmit coil L1 is associated with coil number=1, transmit coil L2 is associated with coil number=2, and transmit coil LN is associated with coil number=N. Similarly, each coil switch of the coil switches 302 is associated with a number from the first number to the last number. For example, coil switch S1 is associated with coil number=1, coil switch S2 is associated with coil number=2, and coil switch SN is associated with coil number=N.

In the data collection method the controller 226 may also close one of the coil switches 302 associated with the coil number to electrically connect the one of the transmit coils 106 associated with the coil number to the H-bridge inverter 202. The controller 226 may control the H-bridge inverter 202 to drive the AC signal 242 to the transmit tank circuit 228. After application of the AC signal 242 to the tank circuit 228, which may charge the transmit tank circuit 228, the controller 226 may sample the coil voltage potential 222 and the coil current representation 232. The controller 226 may then increment the coil number and repeat the data collection method for each one of the coils (i.e., unless the incremented coil number is greater than the last number, which in the case of FIG. 3 is coil number=N).

The controller 226 may also perform calibrations of the transmitter 102. As previously mentioned, the inductance of the transmit coils 106 may fluctuate responsive to temperature fluctuations. As a result, the controller 226 may take into consideration these fluctuations due to temperature fluctuations during the object detection operation. For example, the controller 226 may adjust the value of a threshold minimum Q-factor value, an expected uncoupled resonant frequency value, and a threshold minimum resonant frequency value used during a data processing method and an object detection method based on the temperature signal 236 provided by temperature sensors 218 of FIG. 2. Also, in some aspects, the transmit coils 106 may experience different temperatures from each other. As a result, the controller 226 may adjust measured Q-factors and resonant frequencies for the respective transmit coils 106 based on the temperature differences to prevent temperature differences between the transmit coils 106 from influencing object detection and transmit coil selection.

Furthermore, inductance values of the transmit coils 106 may not be the same. By way of non-limiting example, the inductance values of the transmit coils 106 may vary by about twenty percent (20%) due to manufacturing tolerances. Accordingly, the controller 226 may perform a calibration to normalize differences between the inductance values of the transmit coils 106 to prevent differences between inductance values of the transmit coils 106 from influencing object detection and transmit coil selection.

Figure 4:
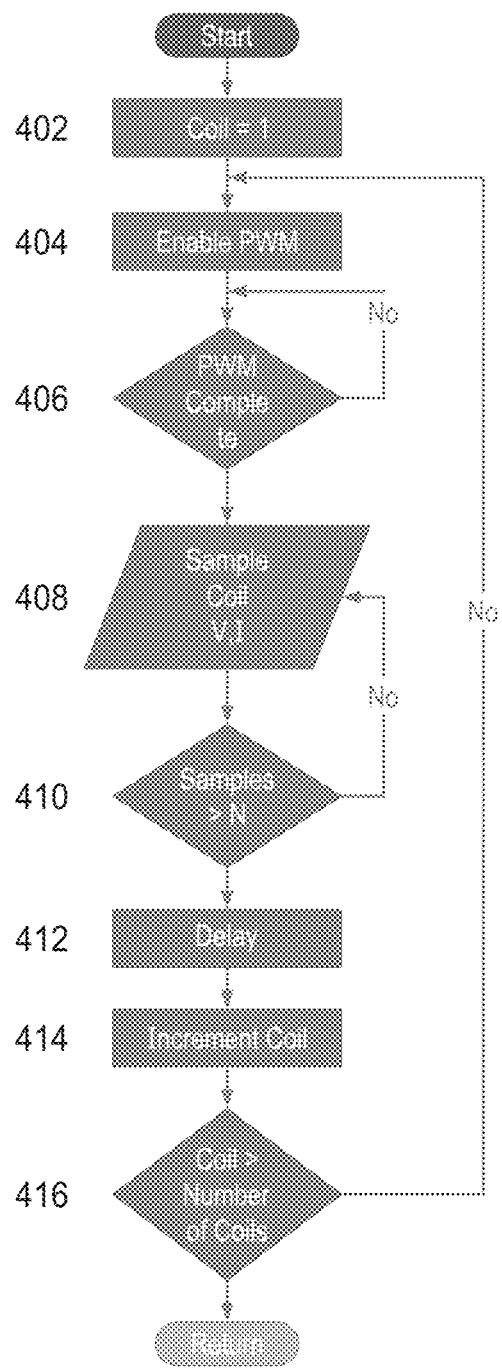
FIGS. 4 and 5 show software algorithms for data collection and detection of foreign objects.

FIG. 4 illustrates a software algorithm for data collection. The data collection routine is shown in FIG. 4. The coil number 1 is considered 402 as default for explanation, though it can be started with any coil. The PWM is enabled 404 for Np cycles. After the Np cycles are complete 406, the ADC 238 of FIG. 2 samples 408 the coil voltage at a very high rate, typically 1.6 MHz, e.g. about 20 times the expected resonance frequency, without limitation. Eight or more data points may provide sufficient data to determine peaks. This ensures that there are several samples available in each resonant frequency of 78 kHz. With 1.6 MHz, twenty samples are available per cycle. The sample collection proceeds until a predefined sample number N is reached 410. With N value of 400, data of about twenty cycles are captured for post processing. The data for each coil can be processed immediately after the data collection or can be processed together with data from other coils. Once data from one coil is collected, and after a delay 412 the next coil is selected 414, and the above process repeats until complete data from the coils is collected 416. The data comprises coil voltage sampled independently using an ADC channel. The coil voltage bandwidth signals may be passed through a comparator inside an integrated circuit to determine frequency by counting zero cross. This may be a parallel path where the coil voltage is also connected to the comparator and the ADC 238. Alternatively, the frequency may also be determined from determined peaks (ADC data) with the knowledge of the number of samples between peaks and sampling time. A comparator reference may be set to the bias voltage of an op-amp. The coil voltage is a bipolar signal with a range+/−VCC/2 at a comparator terminal. The comparator supply voltage may be VCC (+3.3V) and ground GND. The comparator input may be connected to a bias voltage of VCC/2 so that the coil voltage may be within the range of the comparator (shifted from negative VCC/2 to GND). The output of the comparator may be asserted when the comparator input is higher than the reference voltage and vice versa. The output of the comparator is connected to a timer module, which may be a single output capture compare PWM timer (SCCP) module, which starts a timer at the rising edge of the signal, i.e. when the output of the comparator is asserted, and stops the timer when the output of the comparator is again asserted, i.e. at the subsequent rising edge. The time elapsed between the two edges is used to determine the resonant frequency F of the system. The resonant frequency is determined for each coil along with an expected Q-factor value (Qt and Qtr). Frequency bandwidths may be determined from the determined resonant frequencies.

Figure 5:
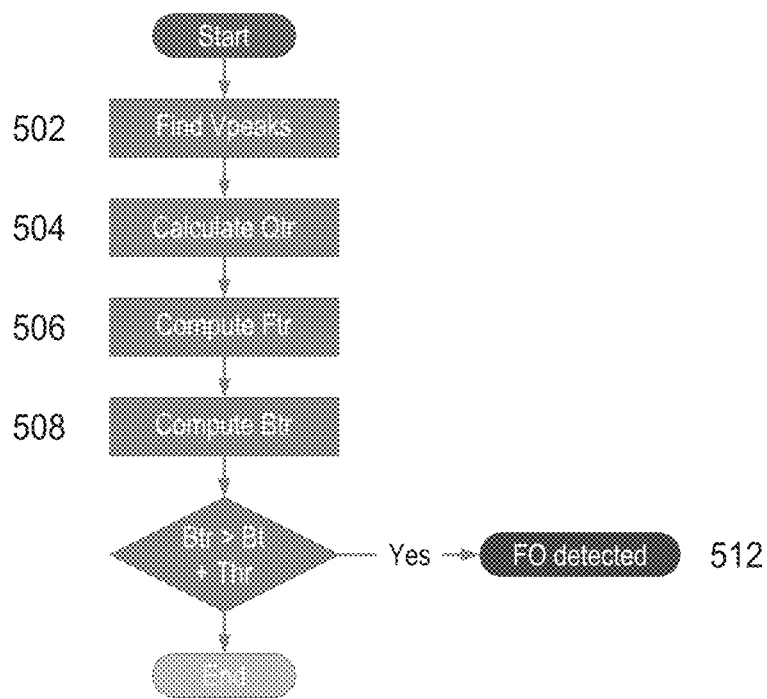

FIG. 5 illustrates an algorithm to determine if a foreign object has been detected, wherein the algorithm is accomplished after data from the coils is collected. The coil voltage waveform is an exponentially decaying sinusoid with a resonant frequency F. The algorithm looks 502 for a peak value by comparing its previous and next sample in a 3-point filter arrangement. At the peak, the previous and the next values are lower than the present value. If three consecutive ADC samples are taken relative to instant n, and if Vn−1 is less than Vn and Vn−2, then Vn−1 is the peak of a sinewave. The positive as well as negative peaks Vp can be identified and stored in an array.

The expected Q-factor value (Qt and Qtr) can be determined 504 from the peak values of voltage or current or both by the following equation:

$$Q = \frac{1}{2}\sqrt{1+\left(\frac{2\pi}{\ln\left(\frac{P_N}{P_{N+1}}\right)}\right)^2}$$

$P_N$—$n^{th}$ peak value
$P_{N+1}$—$n+1^{th}$ peak value

The expected Q-factor value (Qt and Qtr) can be based off a single computation or an average of Q determined over several cycles. The average tends to mask the computational sensitivity to the determined values and is preferred compared to a single value. The expected Q-factor value (Qt and Qtr) as well as F measurements 506 are completed for the coils and the values stored in an array. These measurements are typically done once per board in the factory during the calibration phase and the values may be stored in non-volatile memory for future use.

The above data collection algorithm is run on the transmitter alone (without receiver) and the following information is obtained 508:
Qt—Transmitter Q value
Ft—Transmitter resonant frequency
Bt=Ft/Qt—Transmitter frequency bandwidth These measurements are typically done once per board in the factory during the calibration phase and the values are stored in the non-volatile memory for future use.

A second set of readings are taken when the receiver is in proximity with the transmitter. This is done to check if a foreign object is present before proceeding to the power-transfer phase. Whenever the receiver is placed in proximity with the transmitter, the algorithm of FIG. 5 is run by controller 226 and the following measurements are obtained:
Qtr—Combined Transmitter-Receiver Q value
Ftr—Combined Transmitter-Receiver resonant frequency
Btr=Ftr/Qtr—Combined Transmitter-Receiver frequency bandwidth The measured Combined Transmitter-Receiver frequency bandwidth value Btr is compared 510 with the transmitter frequency bandwidth Bt.

In the event that Btr>Bt+Threshold, then a foreign object is assumed or detected 512 by controller 226 to be present in the system, and power is not provided. If the value of Btr is less than Bt+Threshold, controller 226 concludes that there is no foreign object present in the system, and power may be provided to receiver 104 via coupled coils 114. The threshold can be set based on the frequency bandwidth values of the system. Typical numbers are around 500 Hz for some transmitter designs. A Threshold may be set during transmitter certification and inter-operability testing. As a first pass, the transmitter threshold may be set up with the receivers from a qualification test system. These receivers may be placed on a transmitter with and without a foreign object, and the readings noted for the transmitter. Based on the readings, the threshold can be set between the two (foreign object and no foreign object), such that it is spaced equally from both. This spacing may prevent false detection and missed detection.

Figure 6A:
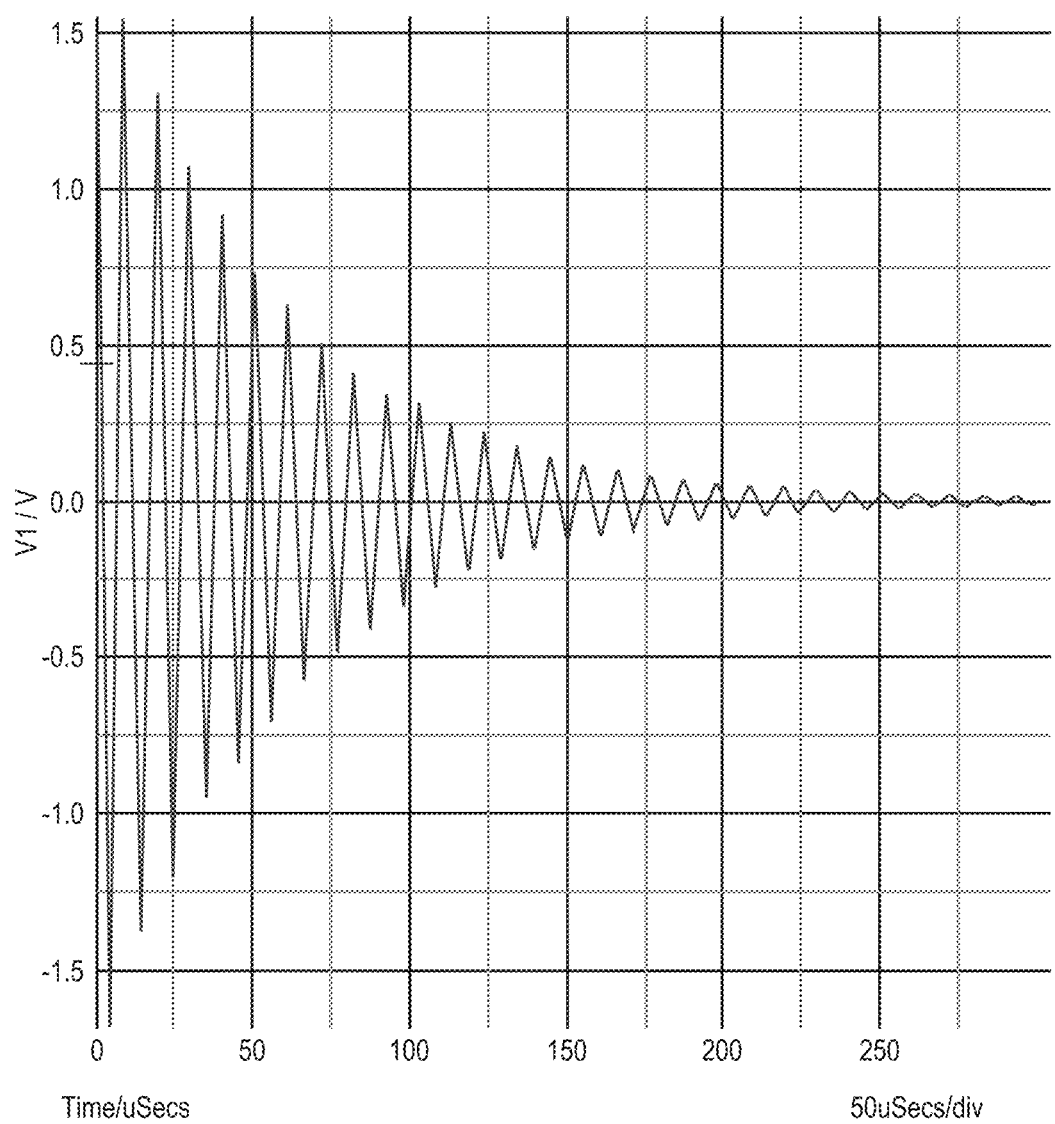
FIGS. 6A and 6B show simulated time domain waveforms of the coil voltage and bandwidth variation of a transmitter alone.
Figure 6B:
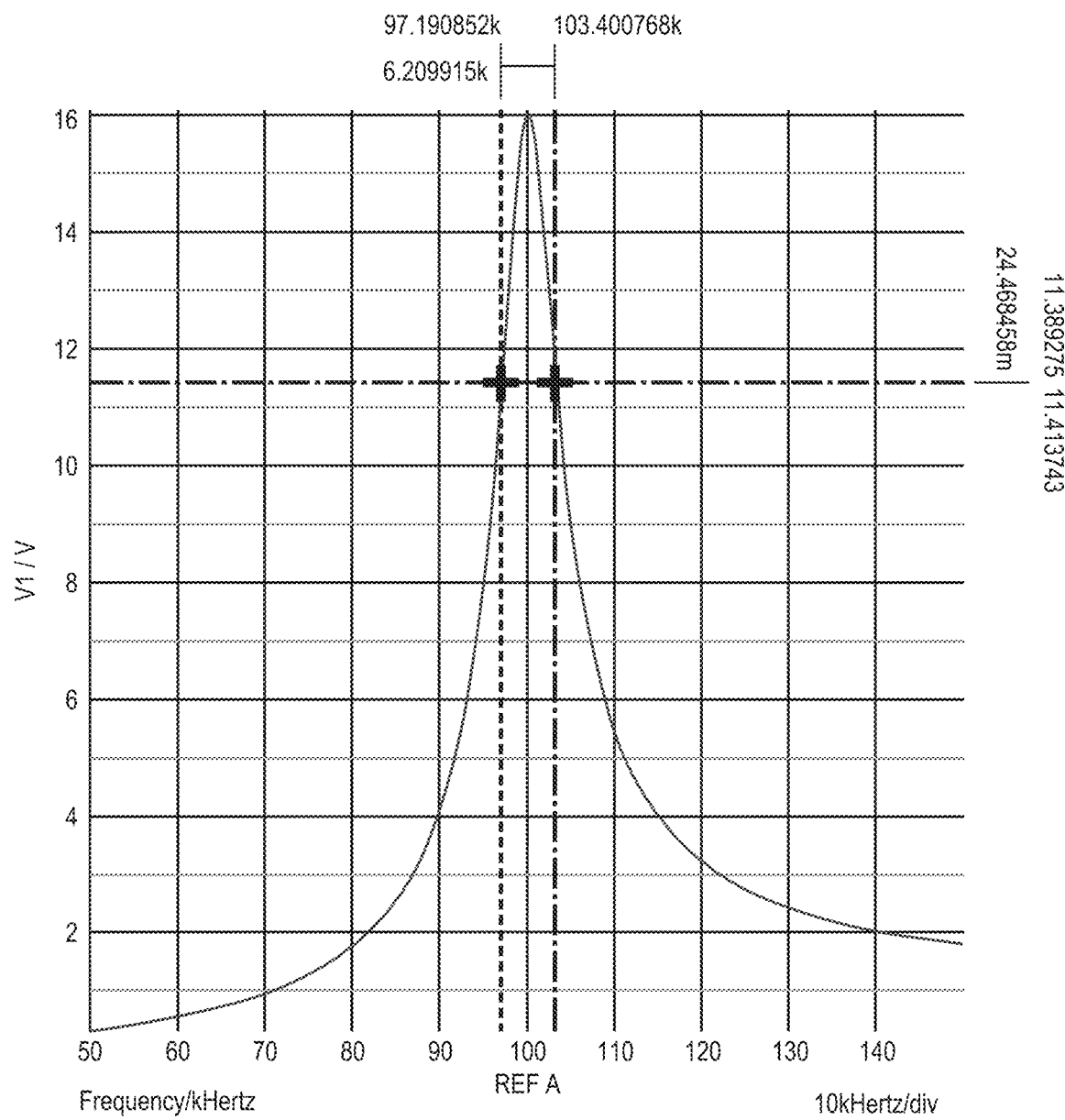

FIGS. 6A and 6B show the simulated time domain waveforms of the coil voltage and frequency bandwidth variation Bt of the transmitter alone.

Figure 7A:
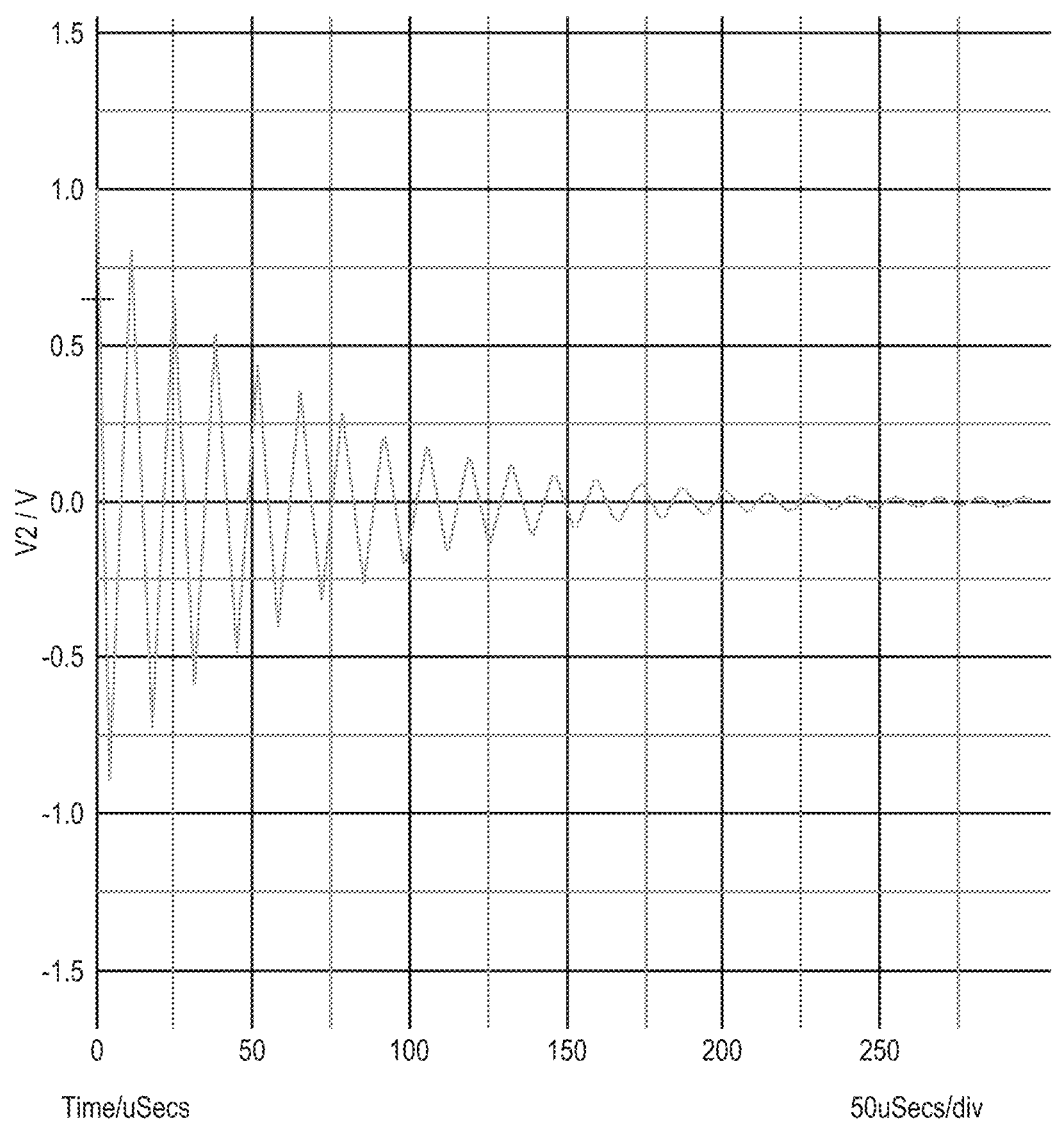
FIGS. 7A and 7B show simulated time domain waveforms of the coil voltage and bandwidth variation of a transmitter with a receiver.
Figure 7B:
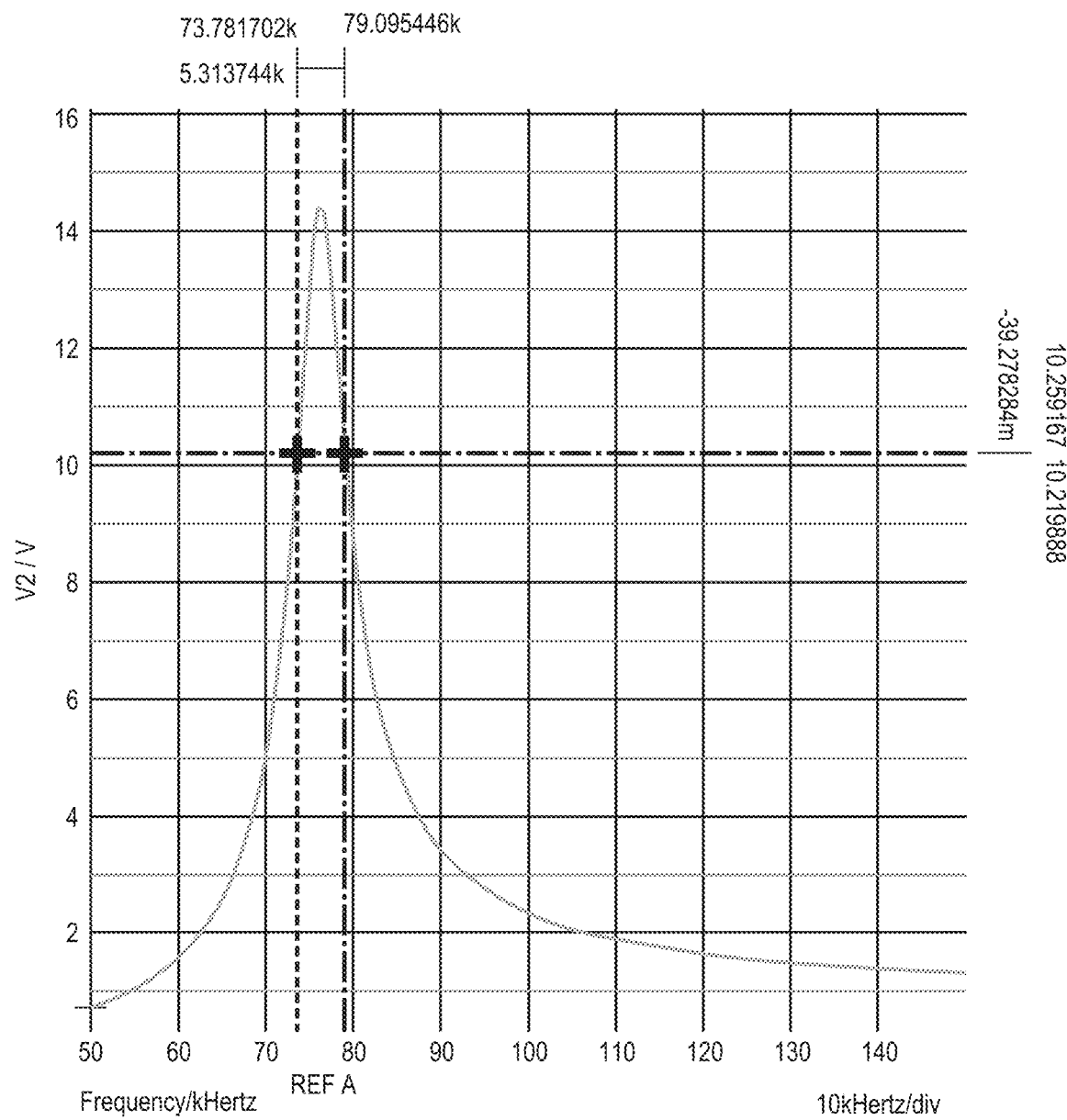

FIGS. 7A and 7B show the simulated time domain waveforms of the coil voltage and frequency bandwidth variation Btr of the transmitter with a receiver.

Figure 8A:
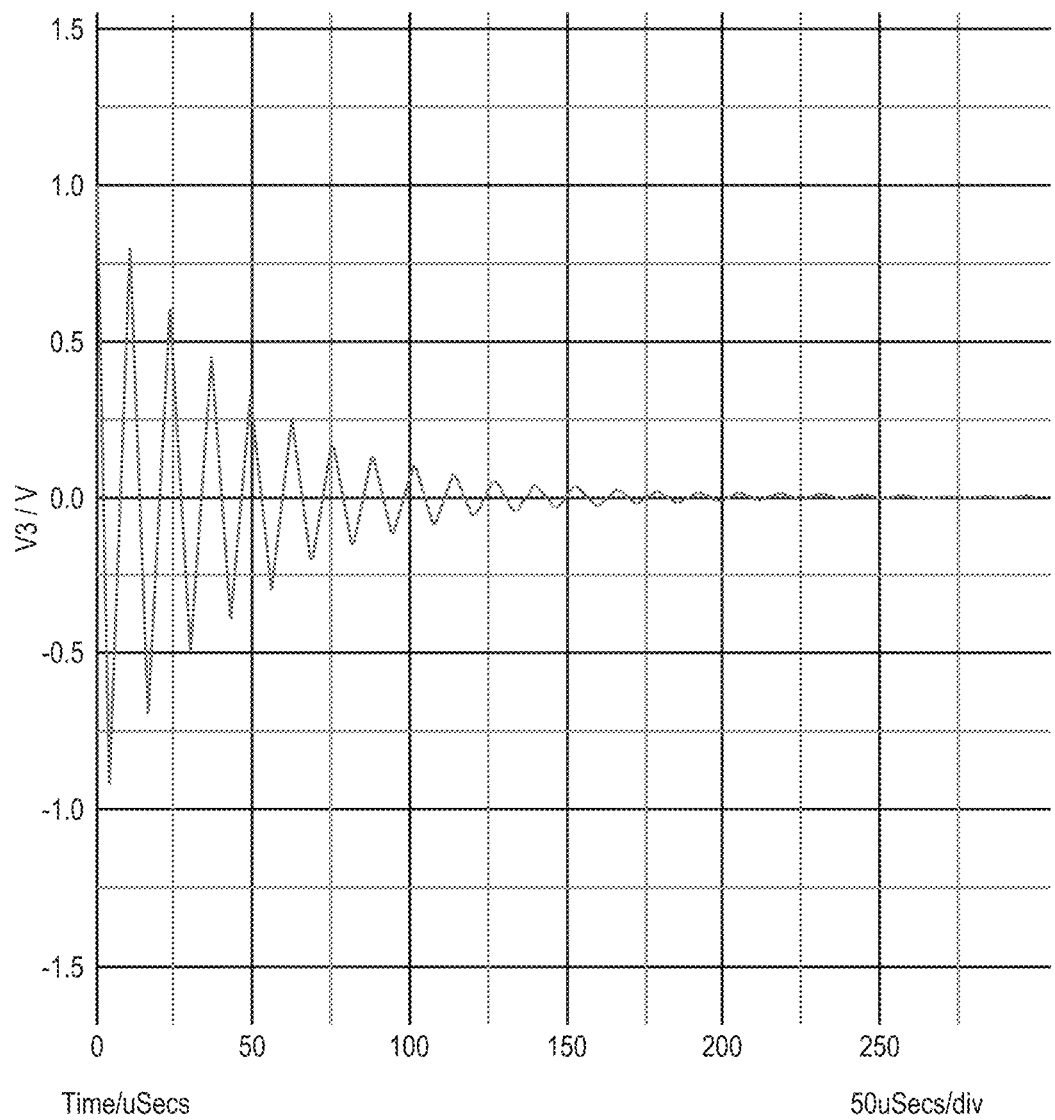
FIGS. 8A and 8B show simulated time domain waveforms of the coil voltage and bandwidth variation of a transmitter with a receiver and a foreign object.
Figure 8B:
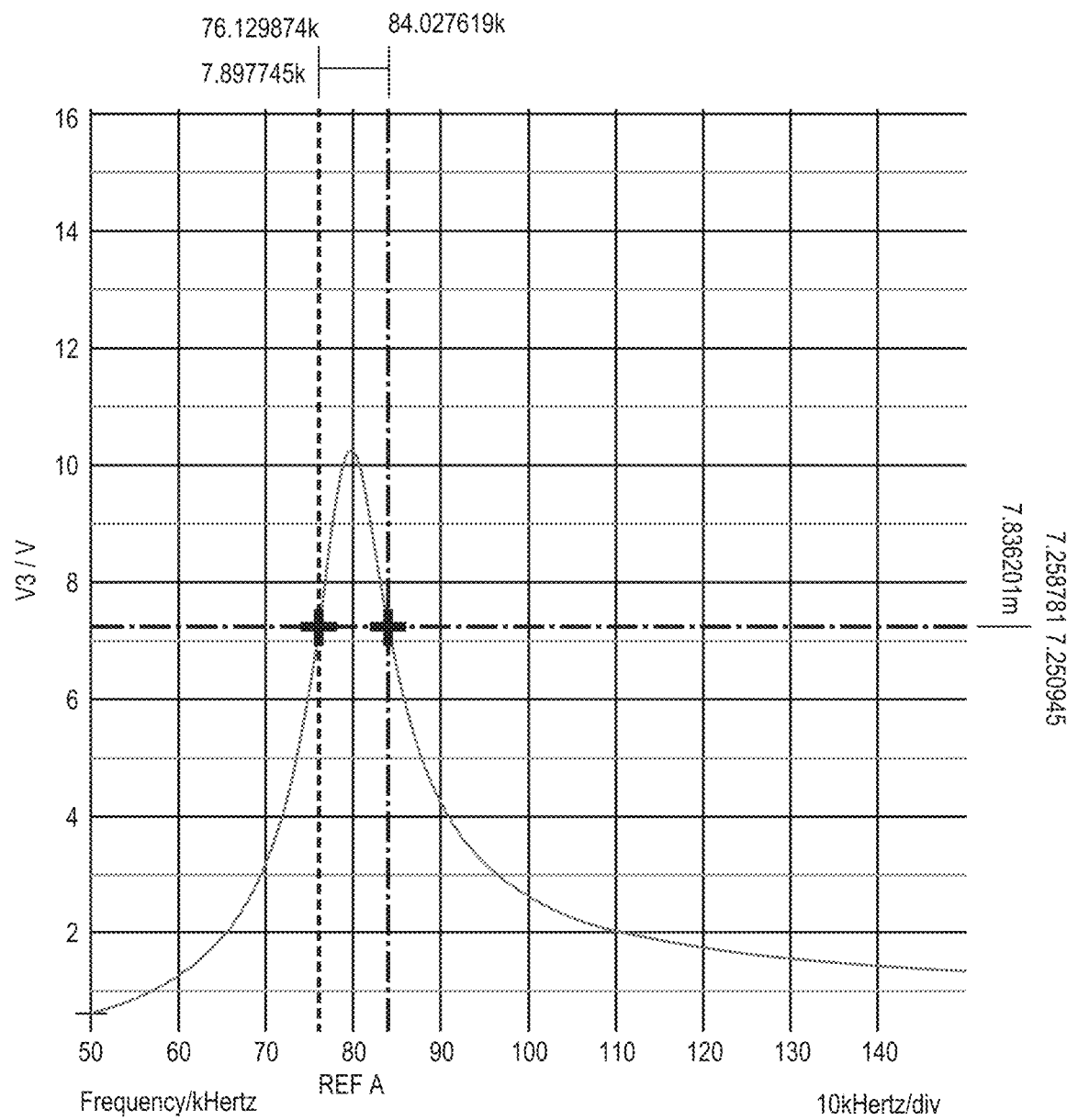

FIGS. 8A and 8B show the simulated time domain waveforms of the coil voltage and frequency bandwidth variation Btr of the transmitter with a receiver and a foreign object.

Figure 9A:
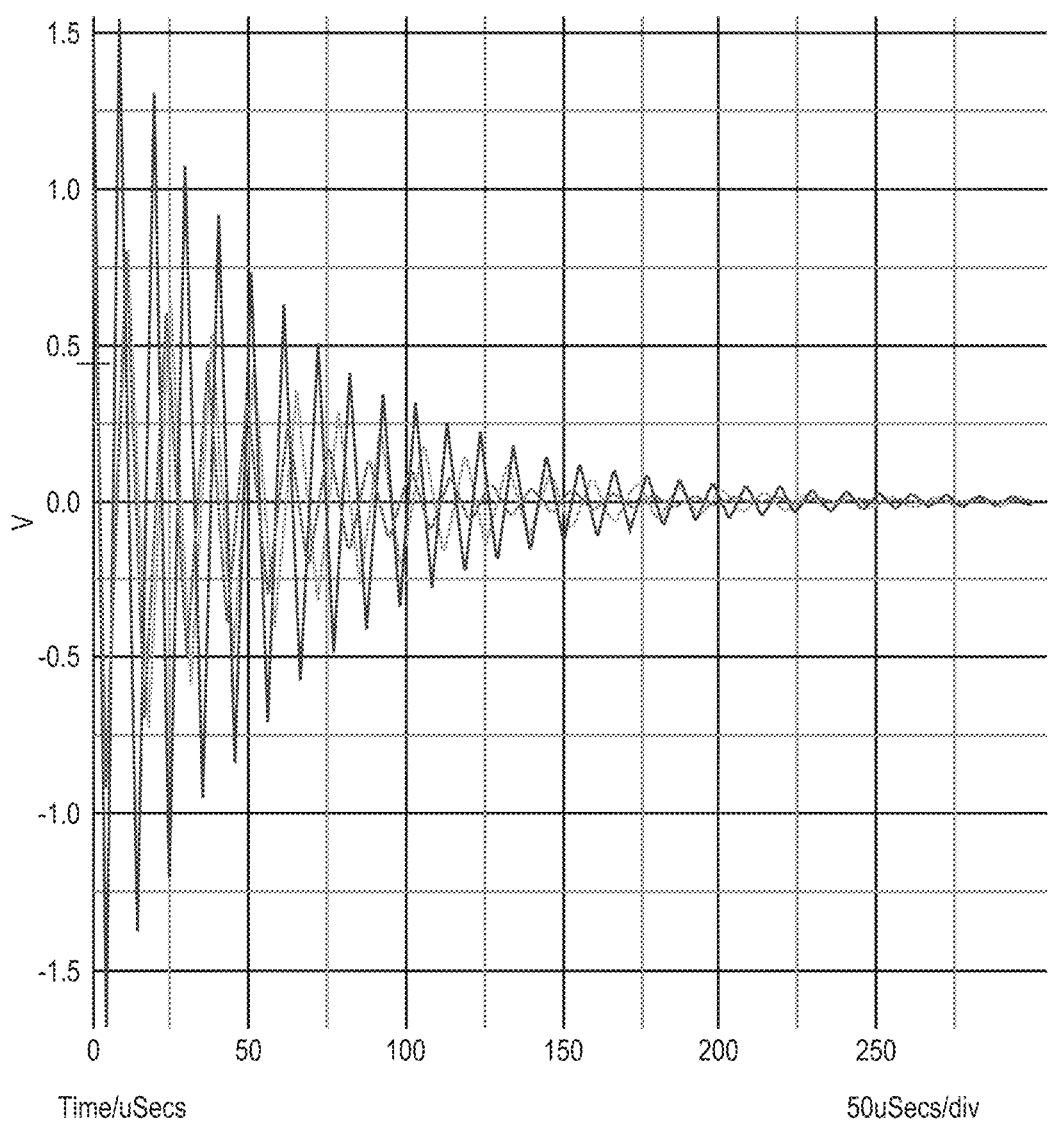
FIGS. 9A and 9B show overlaid waveforms of FIGS. 6A-8A and 6B-8B, respectively.
Figure 9B:
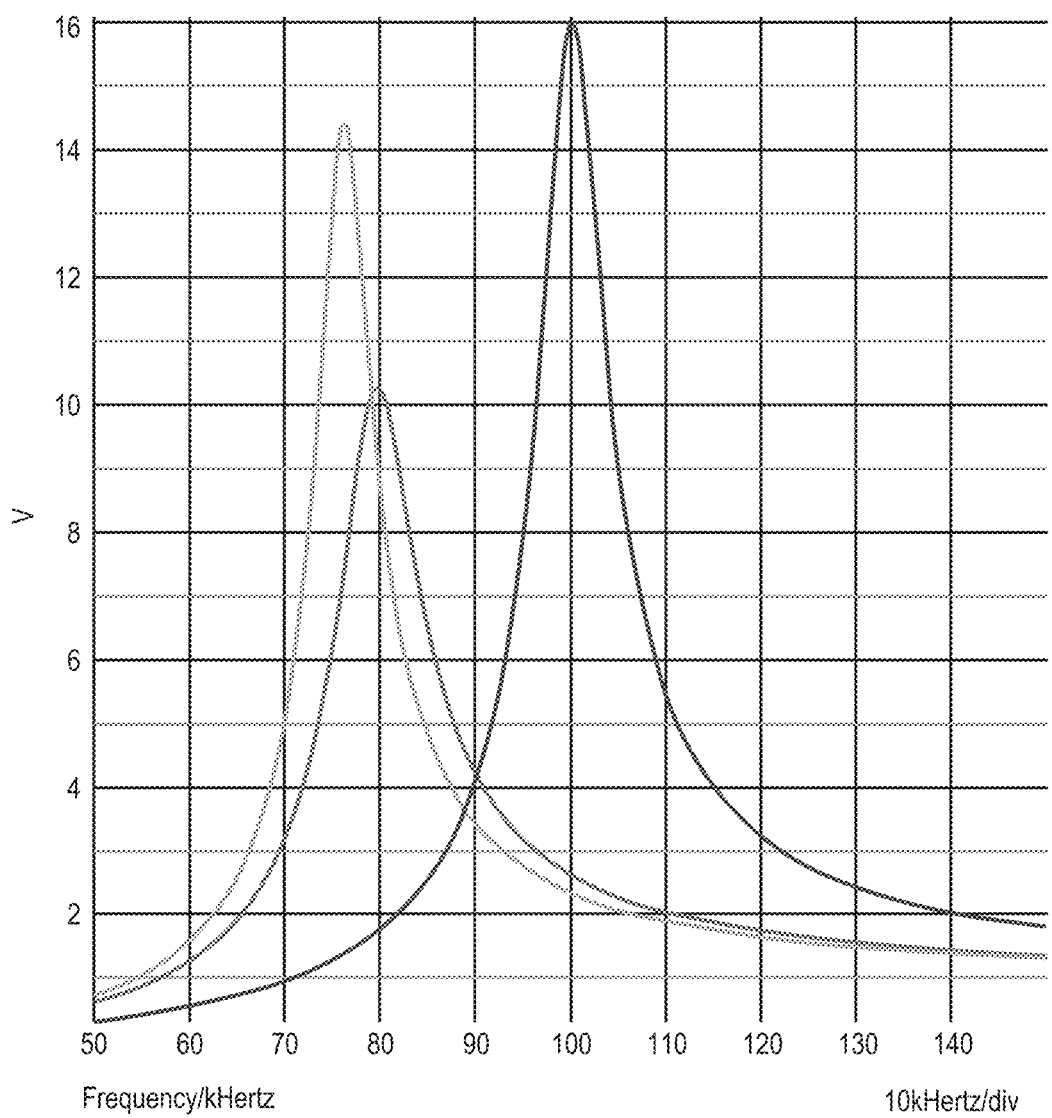

FIGS. 9A and 9B shows the simulated time domain waveforms of the coil voltage and frequency bandwidth variation under different conditions: transmitter alone (FIG. 6), transmitter and receiver (FIGS. 7A and 7B), transmitter and receiver with a foreign object (FIGS. 8A and 8B). With the three waveforms on a single graph, the change in time and frequency domains may be observed caused by a foreign object being introduced.

Figure 10A:
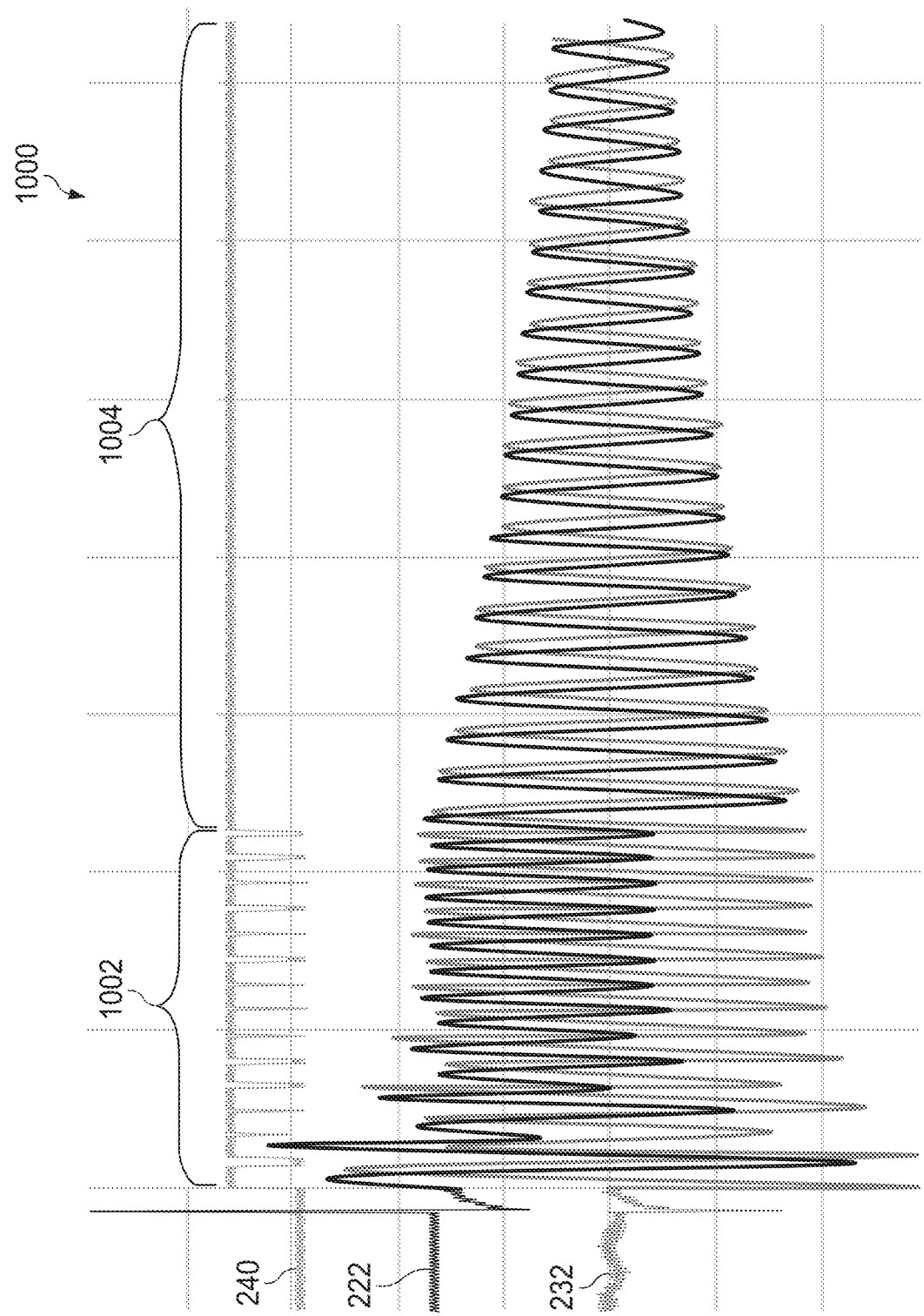
FIG. 10A shows a coil voltage waveform.

FIG. 10A shows the coil voltage waveform when there is no foreign object present. Note that the PWM is ON for a few cycles and is then turned OFF. The resonant tank resonates at a natural frequency and can be seen from the voltage waveform. FIG. 10A is a plot 1000 illustrating one of the AC control signals 240, the coil voltage potential 222, and the coil current representation 232 of the wireless power system 100 of FIG. 2 plotted against time. The plot 1000 illustrates that the AC control signals 240 is turned on during an AC signal on period of time 1002, then turned off for a data collection period of time 1004. By way of non-limiting example, a controller (e.g., controller 226 of FIG. 2) may perform the data collection method of FIG. 4 and the foreign object detection determination of FIG. 5 during the data collection period of time 1004.

FIG. 10B illustrates a zoomed-in version of the plot 1000 of FIG. 10A near a transition between an AC signal on period of time 1002 and a data collection period of time 1004. AC control signals 240 are shown oscillating during the on period of time 1002, then remaining at a DC value during the data collection period of time 1004. The resonant tank resonates at the resonant frequency fr during the data collection period of time 1004, as seen in both the coil voltage potential 222 and the coil current representation 232 (which is approximately ninety degrees out of phase with the coil voltage potential 222).

Figure 11:
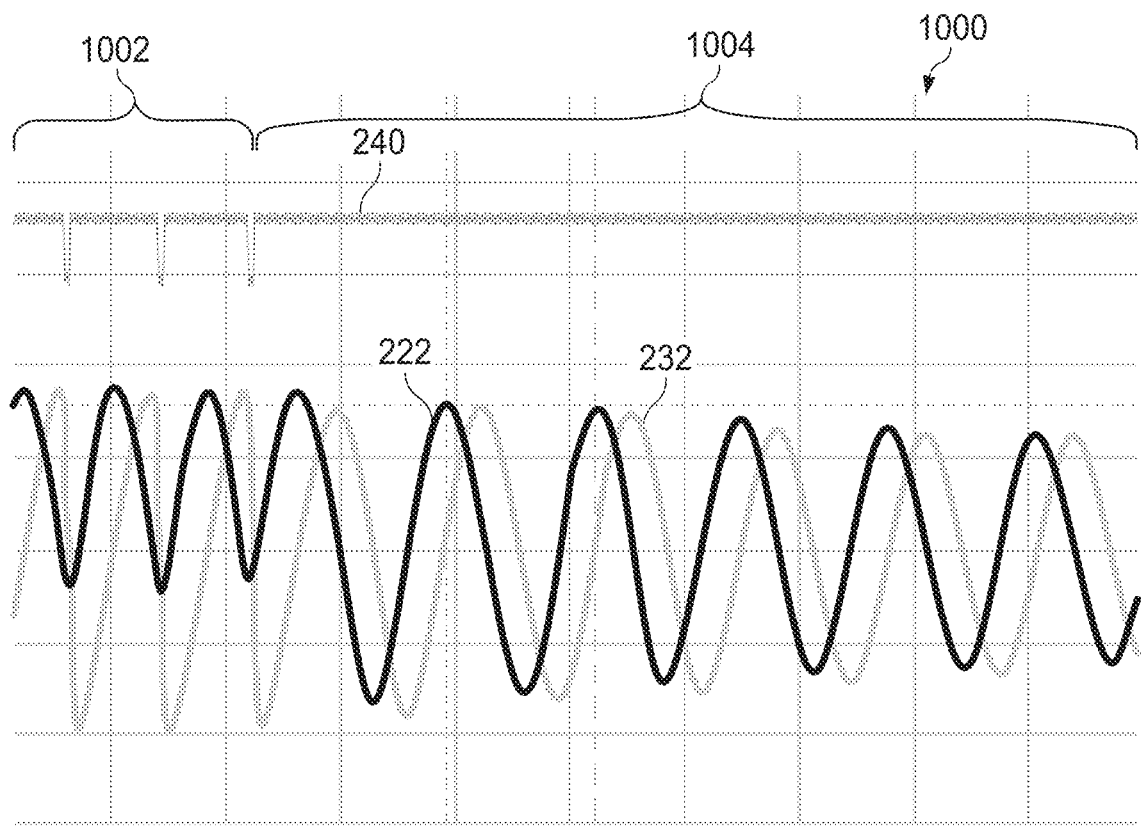
FIGS. 11-13 show experimental results with three different transmitter designs.
Figure 11:
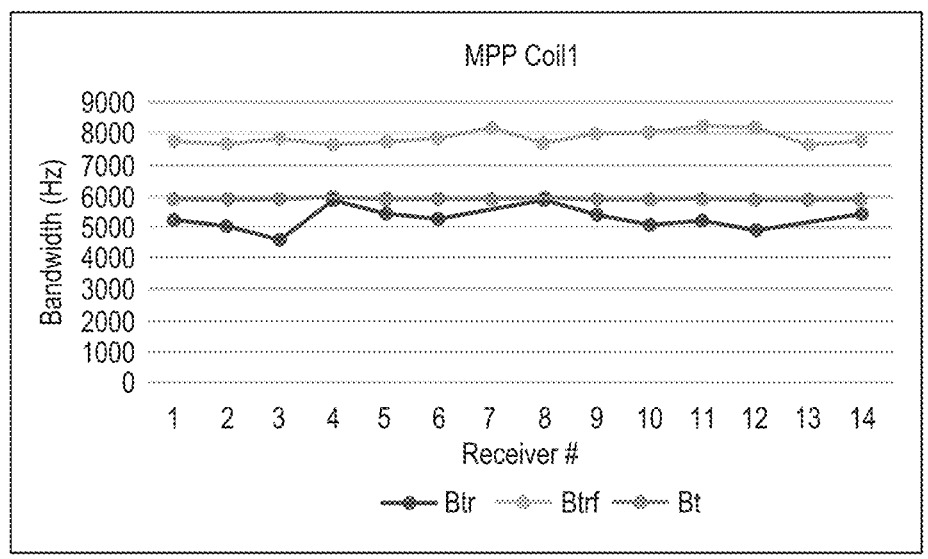
Figure 12:
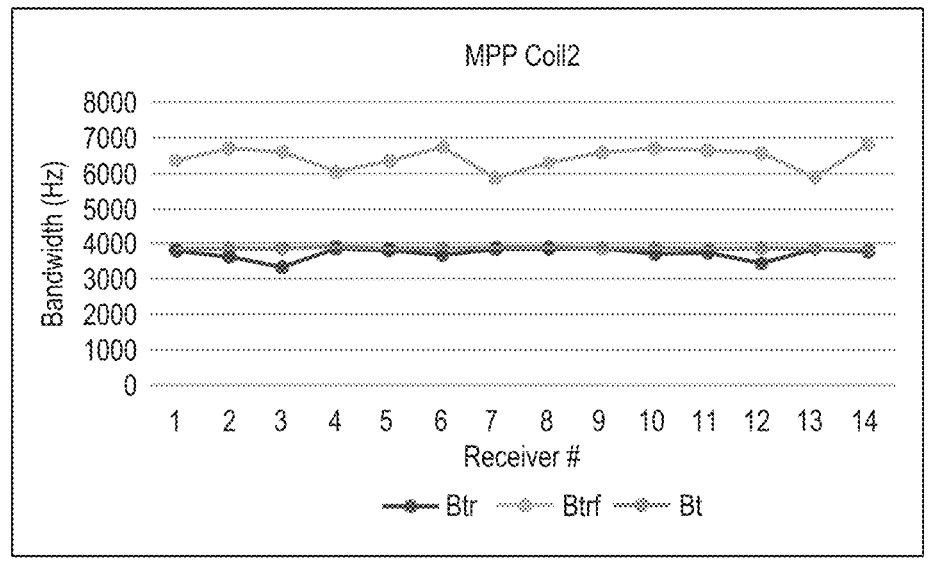
Figure 13:
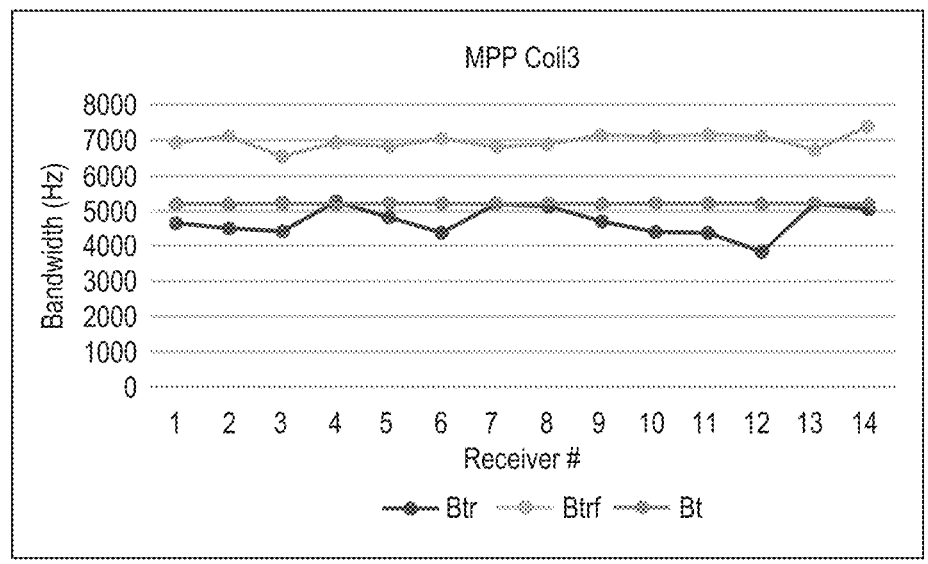

FIGS. 11-13 show the experimental results with three different transmitter designs. Several receivers (14) of different characteristics were used to calculate the system frequency bandwidth. The frequency bandwidth of the transmitter alone Bt is determined once, while the other frequency bandwidths Btr (transmitter and receiver) and Btrf (transmitter, receiver, and foreign object) were determined separately for each receiver without and with foreign object. FIGS. 11 and 12 show the frequency bandwidth numbers of a transmitter design having a magnet along with the transmit coil, while FIG. 13 shows the frequency bandwidth numbers for a transmitter design without any magnets. It is clear from the three transmitter designs that there is a clear indication of the foreign object presence in the system because the frequency bandwidth is higher in each case when there is a foreign object presence in the system.

Aspects may provide accurate computation of the frequency bandwidth value for foreign object detection, without the transmitter receiving a reference Q or frequency values from receiver. Reliable detection of a foreign object on the transmitter in the presence of receiver may be obtained without implementing additional hardware.

Figure 14:
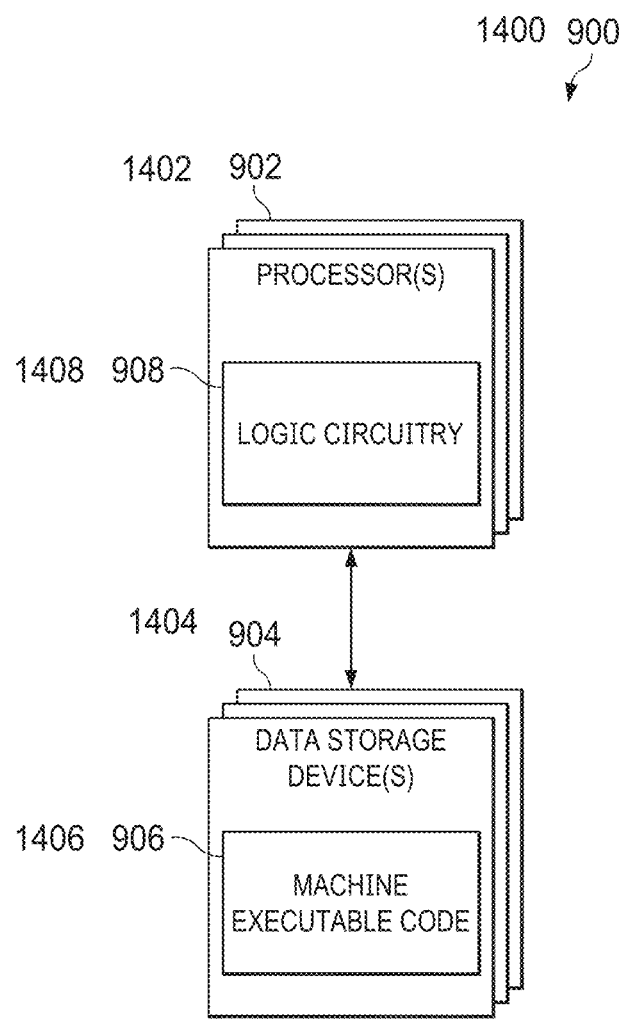
FIG. 14 is a block diagram of circuitry that may be used to implement various functions, operations, acts, processes, and methods disclosed herein.

FIG. 14 is a block diagram of circuitry 1400 that, in some aspects, may be used to implement various functions, operations, acts, processes, and/or methods disclosed herein. The circuitry 1400 includes one or more processors 1402 (sometimes referred to herein as "processors 1402") operably coupled to one or more data storage devices (sometimes referred to herein as "storage 1404"). The storage 1404 includes machine executable code 1406 stored thereon and the processors 1402 include logic circuitry 1408. The machine executable code 1406 includes information describing functional elements that may be implemented by (e.g., performed by) the logic circuitry 1408. The logic circuitry 1408 is adapted to implement (e.g., perform) the functional elements described by the machine executable code 1406. The circuitry 1400, when executing the functional elements described by the machine executable code 1406, may be considered as specific purpose hardware configured for carrying out functional elements disclosed herein. In some aspects the processors 1402 may perform the functional elements described by the machine executable code 1406 sequentially, concurrently (e.g., on one or more different hardware platforms), or in one or more parallel process streams.

When implemented by logic circuitry 1408 of the processors 1402, the machine executable code 1406 adapts the processors 1402 to perform operations of aspects disclosed herein. For example, the machine executable code 1406 may adapt the processors 1402 to perform at least a portion or a totality of the data collection method 400 of FIG. 4, and/or the foreign object detection method 500 of FIG. 5. As another example, the machine executable code 1406 may adapt the processors 1402 to perform at least a portion or a totality of the operations discussed for the controller 226 of FIG. 2. As a further example, the machine executable code 1406 may adapt the processors 1402 to perform at least a portion or a totality of the operations discussed for the processing core 220 of FIG. 2. As a specific, non-limiting example, the machine executable code 1406 may adapt the processors 1402 to perform at least a portion of the object detection operations discussed herein.

The processors 1402 may include a general purpose processor, a specific purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a specific-purpose computer while the general-purpose computer is configured to execute functional elements corresponding to the machine executable code 1406 (e.g., software code, firmware code, hardware descriptions) related to aspects of the present disclosure. It is noted that a general-purpose processor (may also be referred to herein as a host processor or simply a host) may be a microprocessor, but in the alternative, the processors 1402 may include any conventional processor, controller, microcontroller, or state machine. The processors 1402 may also be implemented as a combination of computing devices, such as a combination of a DSP and a microprocessor, a plurality of microprocessors, one or more microprocessors in conjunction with a DSP core, or any other such configuration.

In some aspects the storage 1404 includes volatile data storage (e.g., random-access memory (RAM)), non-volatile data storage (e.g., Flash memory, a hard disc drive, a solid state drive, erasable programmable read-only memory (EPROM), without limitation). In some aspects the processors 1402 and the storage 1404 may be implemented into a single device (e.g., a semiconductor device product, a system on chip (SOC), without limitation). In some aspects the processors 1402 and the storage 1404 may be implemented into separate devices.

In some aspects the machine executable code 1406 may include computer-readable instructions (e.g., software code, firmware code). By way of non-limiting example, the computer-readable instructions may be stored by the storage 1404, accessed directly by the processors 1402, and executed by the processors 1402 using at least the logic circuitry 1408. Also by way of non-limiting example, the computer-readable instructions may be stored on the storage 1404, transferred to a memory device (not shown) for execution, and executed by the processors 1402 using at least the logic circuitry 1408. Accordingly, in some aspects the logic circuitry 1408 includes electrically configurable logic circuitry 1408.

In some aspects the machine executable code 1406 may describe hardware (e.g., circuitry) to be implemented in the logic circuitry 1408 to perform the functional elements. This hardware may be described at any of a variety of levels of abstraction, from low-level transistor layouts to high-level description languages. At a high-level of abstraction, a hardware description language (HDL) such as an IEEE Standard hardware description language (IDL) may be used. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1408 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some aspects, the machine executable code 1406 may include an HDL, an RTL, a GL description, a mask level description, other hardware description, or any combination thereof.

In aspects where the machine executable code 1406 includes a hardware description (at any level of abstraction), a system (not shown, but including the storage 1404) may be configured to implement the hardware description described by the machine executable code 1406. By way of non-limiting example, the processors 1402 may include a programmable logic device (e.g., an FPGA or a PLC) and the logic circuitry 1408 may be electrically controlled to implement circuitry corresponding to the hardware description into the logic circuitry 1408. Also, by way of non-limiting example, the logic circuitry 1408 may include hard-wired logic manufactured by a manufacturing system (not shown, but including the storage 1404) according to the hardware description of the machine executable code 1406.

Regardless of whether the machine executable code 1406 includes computer-readable instructions or a hardware description, the logic circuitry 1408 is adapted to perform the functional elements described by the machine executable code 1406 when implementing the functional elements of the machine executable code 1406. It is noted that although a hardware description may not directly describe functional elements, a hardware description indirectly describes functional elements that the hardware elements described by the hardware description are capable of performing.

Figure 15:
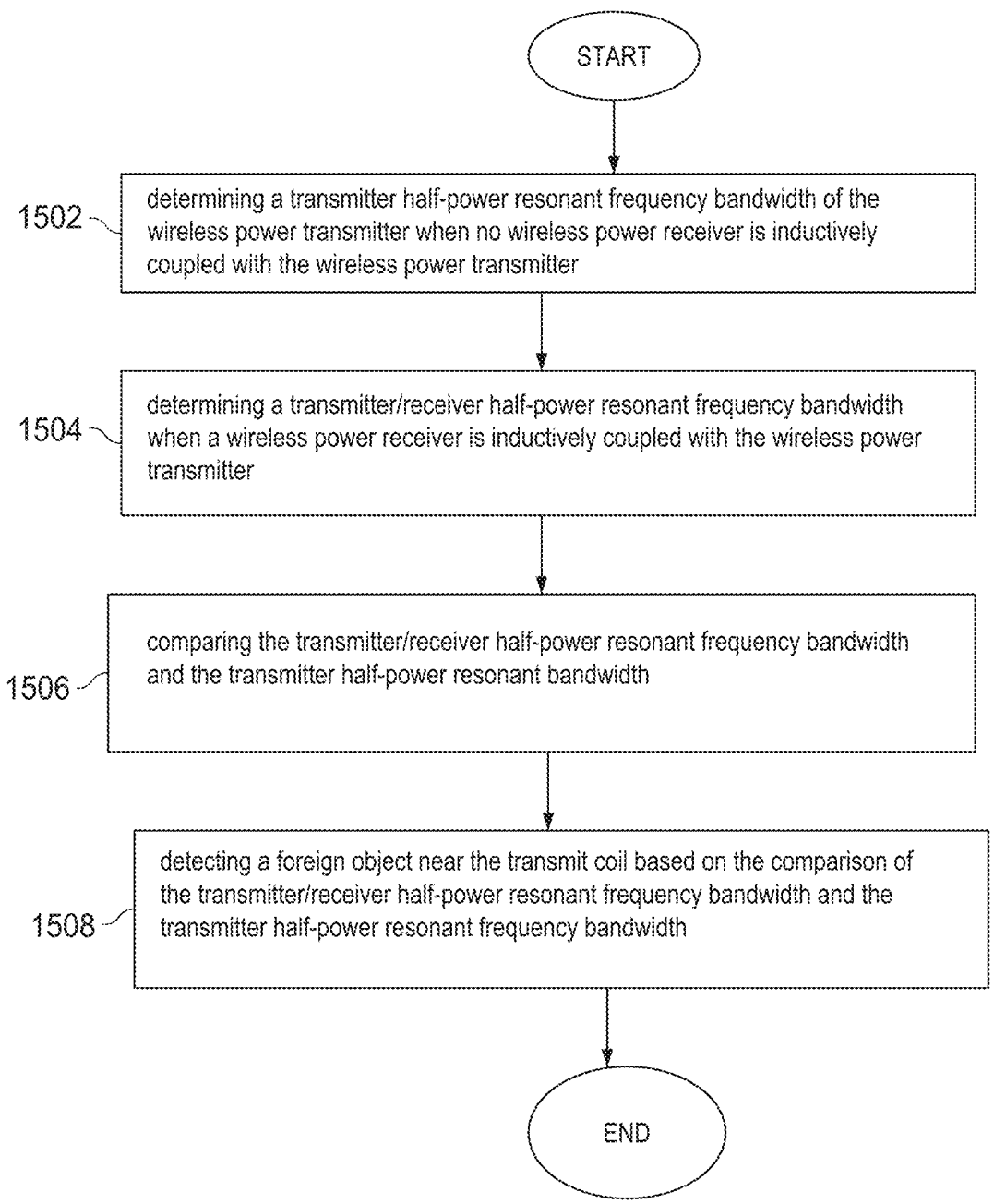
FIG. 15 shows a flow chart of a method for controlling a wireless power transmitter.

FIG. 15 is a flow chart showing the method controlling of a wireless power transmitter. A transmitter frequency bandwidth of the wireless power transmitter when no wireless power receiver is inductively coupled with the wireless power transmitter is determined 1502. A transmitter-receiver frequency bandwidth when a wireless power receiver is inductively coupled with the wireless power transmitter is determined 1504. The transmitter-receiver frequency bandwidth and the transmitter frequency bandwidth are compared 1506. According to one aspect, the comparison may show the transmitter-receiver frequency bandwidth is higher than the transmitter frequency bandwidth. According to another aspect, the comparison may show the transmitter-receiver frequency bandwidth is higher by a threshold margin than the transmitter frequency bandwidth. A foreign object near the transmit coil is detected 1508 based on the comparison of the transmitter-receiver frequency bandwidth and the transmitter frequency bandwidth.

Figure 16:
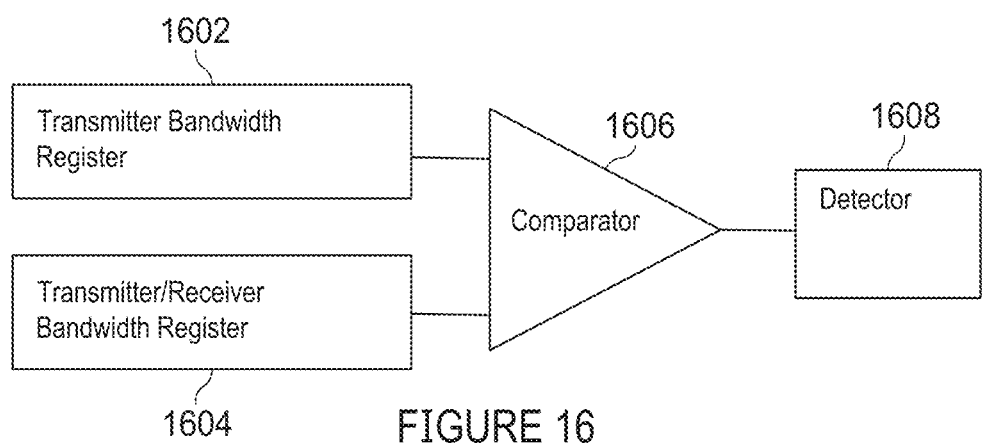
FIG. 16 shows a block diagram of a controller of a wireless power transmitter.

FIG. 16 shows a block diagram of a controller of a wireless power transmitter. A transmitter bandwidth register 1602 and a transmitter-receiver bandwidth register 1604 provide inputs to a comparator 1606. The output of the comparator 1606 is to a detector 1608. A transmitter frequency bandwidth is determined when a wireless power receiver is not inductively coupled with the wireless power transmitter, and the bandwidth is sent to the transmitter bandwidth register 1602. A combined transmitter-receiver frequency bandwidth is determined when a wireless power receiver is inductively coupled with the wireless power transmitter, and the bandwidth is sent to the transmitter-receiver bandwidth register 1604. The comparator 1606 compares the transmitter-receiver frequency bandwidth and a transmitter frequency bandwidth. If the comparator determines the combined transmitter-receiver frequency bandwidth is higher than the transmitter frequency bandwidth, then the comparator sends an output to the detector 1608 indicating a foreign object near the transmit coil is present based on the comparison of the combined transmitter-receiver frequency bandwidth and the transmitter frequency bandwidth.

Although examples have been described above, other variations and examples may be made from this disclosure without departing from the spirit and scope of these disclosed examples

The invention claimed is:

1. A device comprising:
 a controller of a wireless power transmitter to:
  determine a transmitter frequency bandwidth of the wireless power transmitter when no wireless power receiver is inductively coupled with the wireless power transmitter;
  determine a transmitter-receiver frequency bandwidth when a wireless power receiver is inductively coupled with the wireless power transmitter;
  compare the transmitter-receiver frequency bandwidth and a transmitter frequency bandwidth; and
  detect a foreign object near the transmit coil based on a comparison of the transmitter-receiver frequency bandwidth and the transmitter frequency bandwidth.

2. The device as claimed in claim 1, wherein the transmitter frequency bandwidth is the frequency range where a magnitude of the gain is about 3 dB from a peak magnitude, and wherein the transmitter-receiver frequency bandwidth is the frequency range where a magnitude of the gain is about 3 dB from a peak magnitude.

3. The device as claimed in claim 1, wherein the controller is to detect the foreign object based on the comparison being the transmitter-receiver frequency bandwidth is higher than the transmitter frequency bandwidth.

4. The device as claimed in claim 1, wherein the controller comprises an analog to digital converter to sample a characteristic of the transmit coil.

5. The device as claimed in claim 4, wherein the characteristic is a transmit coil voltage potential or a transmit coil current.

6. The device as claimed in claim 1, comprising data storage electrically connected to the controller to store the transmitter frequency bandwidth.

7. The device as claimed in claim 1, wherein the controller is to determine a transmitter frequency bandwidth and a transmitter-receiver frequency bandwidth for respective ones of a plurality of transmit coils, compare the frequency bandwidths for respective ones of the plurality of transmit coils, and detect a foreign object based on comparisons for respective ones of the plurality of transmit coils.

8. A method comprising:
 controlling of a wireless power transmitter by:
  determining a transmitter frequency bandwidth of the wireless power transmitter when no wireless power receiver is inductively coupled with the wireless power transmitter;
  determining a transmitter-receiver frequency bandwidth when a wireless power receiver is inductively coupled with the wireless power transmitter;
  comparing the transmitter-receiver frequency bandwidth and the transmitter frequency bandwidth; and
  detecting a foreign object near the transmit coil based on a comparison of the transmitter-receiver frequency bandwidth and the transmitter frequency bandwidth.

9. The method as claimed in claim 8, wherein determining the transmitter frequency bandwidth comprises determining the frequency range where a magnitude of the gain is about 3 dB from a peak magnitude, and wherein determining the transmitter-receiver frequency bandwidth comprises determining a frequency range where a magnitude of the gain is about 3 dB from a peak magnitude.

10. The method as claimed in claim 8, wherein detecting a foreign object comprises detecting a transmitter-receiver frequency bandwidth higher than the transmitter frequency bandwidth.

11. The method as claimed in claim 8, comprising converting a characteristic of the wireless power transmitter from analog to digital.

12. The method as claimed in claim 11, wherein the characteristic is a transmit coil voltage potential or a transmit coil current.

13. The method as claimed in claim 8, comprising storing the transmitter frequency bandwidth.

14. The method as claimed in claim 8, comprising determining a transmitter frequency bandwidth and a transmitter-receiver frequency bandwidth of respective ones of a plurality of transmit coils, comparing the frequency bandwidths of respective ones of the plurality of transmit coils, and detecting a foreign object based on comparisons of frequency bandwidths of respective ones for a plurality of transmit coils.

15. A system comprising:
a wireless power transmitter comprising:
- a tank circuit including a transmit coil to inductively couple to a receive coil of a wireless power receiver; and
- a controller of the wireless power transmitter to:
  - determine a transmitter frequency bandwidth of the wireless power transmitter when no wireless power receiver is inductively coupled with the wireless power transmitter;
  - determine a transmitter-receiver frequency bandwidth when a wireless power receiver is inductively coupled with the wireless power transmitter;
  - compare the transmitter-receiver frequency bandwidth and the transmitter frequency bandwidth; and
  - detect a foreign object near the transmit coil based on a comparison of the transmitter-receiver frequency bandwidth and the transmitter frequency bandwidth.

16. The system as claimed in claim 15, wherein the controller is to determine the transmitter frequency bandwidth is the frequency range where a magnitude of the gain is about 3 dB from a peak magnitude, and wherein the controller is to determine the transmitter-receiver frequency bandwidth is a frequency range where a magnitude of the gain is about 3 dB from a peak magnitude.

17. The system as claimed in claim 15, wherein the controller is to detect a foreign object based on the comparison being the transmitter-receiver frequency bandwidth is higher than the transmitter frequency bandwidth.

18. The system as claimed in claim 15, wherein the controller comprises an analog to digital converter to sample a characteristic of the transmit coil.

19. The system as claimed in claim 15, wherein the characteristic is a transmit coil voltage potential or a transmit coil current.

20. The system as claimed in claim 15, comprising data storage electrically connected to the controller to store the transmitter frequency bandwidth.

21. The system as claimed in claim 15, wherein the controller is to determine a transmitter frequency bandwidth and a transmitter-receiver frequency bandwidth for respective ones of a plurality of transmit coils, compare the frequency bandwidths of respective ones of the plurality of transmit coils, and detect a foreign object based on comparisons of frequency bandwidths of respective ones of the plurality of transmit coils.

* * * * *